United States Patent
Yu et al.

(10) Patent No.: US 11,490,326 B2
(45) Date of Patent: Nov. 1, 2022

(54) SLICE-BASED COMMUNICATIONS METHOD AND DEVICE

(71) Applicant: HUAWEI TECHNOLOGIES CO., LTD., Guangdong (CN)

(72) Inventors: Fang Yu, Beijing (CN); Hui Ni, Beijing (CN); Yan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/108,924

(22) Filed: Aug. 22, 2018

(65) Prior Publication Data

US 2018/0368061 A1  Dec. 20, 2018

Related U.S. Application Data

(63) Continuation of application No. PCT/CN2017/083619, filed on May 9, 2017.

(51) Int. Cl.
| | | |
|---|---|---|
| *H04W 48/18* | (2009.01) | |
| *H04W 8/12* | (2009.01) | |
| *H04W 48/06* | (2009.01) | |
| *H04W 8/00* | (2009.01) | |
| *H04W 8/02* | (2009.01) | |

(Continued)

(52) U.S. Cl.
CPC .......... *H04W 48/18* (2013.01); *H04W 8/005* (2013.01); *H04W 8/02* (2013.01); *H04W 8/12* (2013.01); *H04W 48/06* (2013.01); *H04W 60/00* (2013.01); *H04W 8/205* (2013.01); *H04W 60/04* (2013.01); *H04W 84/042* (2013.01)

(58) Field of Classification Search
CPC ..... H04W 60/00; H04W 48/18; H04M 15/66; H04M 15/8016; H04M 15/8033
See application file for complete search history.

(56) References Cited

U.S. PATENT DOCUMENTS

| | | | |
|---|---|---|---|
| 10,299,128 B1 * | 5/2019 | Suthar | .................. H04W 12/06 |
| 2014/0119286 A1 | 5/2014 | Kuehnel | |

(Continued)

FOREIGN PATENT DOCUMENTS

| | | |
|---|---|---|
| CN | 102348249 A | 2/2012 |
| CN | 104484228 A | 4/2015 |

(Continued)

OTHER PUBLICATIONS

3GPP TS 23.502 V0.3.0 (Mar. 2017),3rd Generation Partnership Project;Technical Specification Group Services and System Aspects;Procedures for the 5G System;Stage 2 (Release 15),total 115 pages.

(Continued)

*Primary Examiner* — Ayaz R Sheikh
*Assistant Examiner* — Debebe A Asefa
(74) *Attorney, Agent, or Firm* — Huawei Technologies Co., Ltd.

(57) ABSTRACT

The present disclosure relates to a slice-based communications method. In one example method, an access and mobility management function (AMF) node sends a first request message to a network slice selection function (NSSF) node. The AMF node receives a response message from the NSSF node. The AMF node obtains, based on the response message, allowed network slice selection assistance information (NSSAI).

20 Claims, 11 Drawing Sheets

(51) Int. Cl.
*H04W 60/00* (2009.01)
*H04W 8/20* (2009.01)
*H04W 60/04* (2009.01)
*H04W 84/04* (2009.01)

(56) References Cited

U.S. PATENT DOCUMENTS

| | | | |
|---|---|---|---|
| 2018/0206152 A1 | 7/2018 | Zhang et al. | |
| 2018/0270877 A1* | 9/2018 | Lee | H04W 76/30 |
| 2018/0317163 A1* | 11/2018 | Lee | H04W 48/18 |
| 2019/0223093 A1* | 7/2019 | Watfa | H04W 36/06 |
| 2019/0357129 A1* | 11/2019 | Park | H04W 88/14 |
| 2020/0059989 A1* | 2/2020 | Velev | H04W 36/12 |
| 2021/0037505 A1* | 2/2021 | Kim | H04L 1/0002 |
| 2021/0136769 A1* | 5/2021 | Niu | H04L 5/0055 |

FOREIGN PATENT DOCUMENTS

| | | |
|---|---|---|
| CN | 106341832 A | 1/2017 |
| CN | 106375987 A | 2/2017 |
| CN | 106412905 A | 2/2017 |
| CN | 106550410 A | 3/2017 |
| CN | 106572516 A | 4/2017 |
| EP | 3327992 A1 | 5/2018 |

OTHER PUBLICATIONS

3GPP TS 23.501 V0.4.0 (Apr. 2017),3rd Generation Partnership Project;Technical Specification Group Services and System Aspects-;System Architecture for the 5G System;Stage 2 (Release 15),total 124 pages.

International Search Report and Written Opinion issued in International Application No. PCT/CN2017/083619 dated Oct. 27, 2017, 18 pages.

Office Action issued in Chinese Application No. 201780004978.7 dated Apr. 13, 2020, 19 pages (with English translation).

S2-173206 Telecom Italia et al.,"23.501: S-NSSAI to NSI relationship and introduction of the Core Network Slice Instance Identifier" ,SA WG2 Meeting #121,May 15-19, 2017, Hangzhou, China,total 5 pages.

S2-171027 ZTE et al.,"Network Slicing Architecture Alignment for the Support of Standalone Network Slice Selection Function (NSSF)",SA WG2 Meeting #119,Feb. 13-17, 2017, Dubrovnik, Croatia,total 11 pages.

S2-171027 ZTE et al.,"Proposed architecture alignments of Network Slicing Conclusion with 5G Core Overall Architecture in TS 23.501",SA WG2 Meeting #119,Feb. 13-17, 2017, Dubrovnik, Croatia,total 7 pages.

Extended European Search Report issued in European Application No. 17895506.8 dated Dec. 14, 2018.

3GPP TR 23.799 V14.0.0 (Dec. 2016), 3rd Generation Partnership Project;Technical Specification Group Services and System Aspects;Study on Architecture for Next Generation System (Release 14), total 522 pages.

Samsung, SK Telecom,"TS 23.501: PLMN-specific NSSAI",SA WG2 Meeting #120 27 Mar. 31, 2017, Busan, South Korea,S2-171891, total 5pages.

Apple,"A solution of network slice instance selection and association",SA WG2 Meeting #S2-116BIS Aug. 29-Sep. 2, 2016, Sanya, P.R China,S2-164599,total 6pages.

Huawei, HiSilicon,"Interim Agreements for network slicing",3GPP TSG SA WG2 Meeting #117 17 Oct. 21, 2016, Kaohsiung city, Taiwan ,S2-165756, total 4 pages.

* cited by examiner

SLICE-BASED COMMUNICATIONS METHOD AND DEVICE

CROSS-REFERENCE TO RELATED APPLICATIONS

This application is a continuation of International Application No. PCT/CN2017/083619, filed on May 9, 2017, the disclosure of which is hereby incorporated by reference in its entirety.

TECHNICAL FIELD

Embodiments of the present disclosure belong to the field of communications technologies, and in particular, to a slice-based communications method and device.

BACKGROUND

A network slice is a network architecture provided in a fifth-generation (5G) mobile communications system to respond to different user requirements, and a network and management may be customized to better satisfy a customized requirement of each service of a consumer and an enterprise. Supporting a network slice is an important part of a next-generation architecture.

A 5G network supports a deployment scenario as follows: a single-user equipment (UE) multi-slice scenario in which one UE can simultaneously access a plurality of slice instances of a core network. The plurality of slice instances share some network functions including an access and mobility management function (AMF). In this scenario, an access network node needs to select a proper AMF based on network slice selection assistance information (NSSAI) supported by an AMF, and NSSAI requested by UE.

The NSSAI includes configured NSSAI and allowed NSSAI. The configured NSSAI and the allowed NSSAI are stored on UE. The configured NSSAI is default NSSAI configured on the UE. The allowed NSSAI is NSSAI that is returned by a PLMN to the UE after the PLMN accepts an attach request of the UE and that is allowed by the network. The UE carries the allowed NSSAI in a subsequent network access process. A radio access network (RAN) node selects an AMF based on the configured NSSAI or the allowed NSSAI carried by the UE.

An NSSF is a function independent from the AMF, and can select a group of slice instances for the UE when the UE initially accesses a network. Currently, when an AMF node selects a slice for UE by querying slice information by using an NSSF node, the NSSF node provides slice information supported in a registration area of the UE. Therefore, an AMF determines, for the UE, slice selection assistance information also supported in the registration area of the UE. The slice selection assistance information is used by a RAN to select a proper AMF for the UE in a subsequent NAS process. After the UE moves and performs a tracking area update (TAU) process, the registration area of the UE changes. The slice information supported by a network may change in a new registration area. In other words, a slice that can provide a service for the UE also changes. In this case, the slice selection assistance information previously determined cannot be used, the RAN cannot select a proper AMF for the UE based on the slice selection assistance information, and the AMF needs to query, from the NSSF node again, slice information supported by a network in the new registration area, and determine, for the UE, slice selection assistance information supported in the new registration area. As a result, the AMF node performs repeated query or blind selection, and the AMF and the NSSF repeatedly interact with each other, causing additional signaling and overheads in a system.

SUMMARY

Embodiments of the present disclosure provide a slice-based communications method and device, to avoid querying again slice information supported by a network in a new registration area, and reduce system overheads when a slice that provides a service for UE changes.

According to a first aspect, a slice-based communications method is provided. The method includes: sending, by an AMF node, a first request message to an NSSF node; and receiving, by the AMF node, a response message from the NSSF node, and obtaining, based on the response message, allowed NSSAI of a terminal device and service area information corresponding to the allowed NSSAI.

The AMF node obtains the allowed network slice selection assistance information NSSAI of the terminal device and the service area information corresponding to the allowed NSSAI from the NSSF node, to avoid repeated interaction between the AMF node and the NSSF node after a registration area change caused because the terminal device moves. Therefore, this improves signaling exchange and processing efficiency and reduces system overheads.

With reference to the first aspect, in a first possible implementation of the first aspect, the obtaining, by the AMF node based on the response message, allowed NSSAI of a terminal device and service area information corresponding to the allowed NSSAI includes: when the response message carries the allowed NSSAI and the service area information corresponding to the allowed NSSAI, obtaining, by the AMF node, the allowed NSSAI and the service area information corresponding to the allowed NSSAI from the response message; or when the response message carries the allowed NSSAI, obtaining, by the AMF node, the allowed NSSAI from the response message, and obtaining, based on a correspondence between NSSAI and a service area, the service area information corresponding to the allowed NSSAI; or when the response message carries first NSSAI and service area information corresponding to the first NSSAI, determining, by the AMF node based on the first NSSAI and the service area information corresponding to the first NSSAI, the allowed NSSAI and the service area information corresponding to the allowed NSSAI.

The AMF node may obtain the allowed NSSAI of the terminal device and the service area information of the allowed NSSAI in different diversified manners based on different content carried by the response message, thereby reducing a quantity of times the allowed NSSAI is repeatedly requested, and system overheads.

With reference to the first aspect or the first possible implementation of the first aspect, in a second possible implementation of the first aspect, the when the response message carries the allowed NSSAI, obtaining, by the AMF node based on a correspondence between NSSAI and a service area of the NSSAI, the allowed NSSAI and the service area information corresponding to the allowed NSSAI further includes: obtaining, by the AMF node, the correspondence between NSSAI and a service area from the NSSF node.

After the correspondence between NSSAI and a service area is obtained, it may be avoided that the correspondence between NSSAI and a service area is obtained each time a registration request of the terminal device is received, thereby reducing system overheads.

With reference to the first aspect or either of the first possible implementation and the second possible implementation of the first aspect, in a third possible implementation of the first aspect, the method further includes: querying, by the AMF node, subscription information of the terminal device, where the subscription information includes subscribed NSSAI of the terminal device, the first request message carries the first NSSAI, and the first NSSAI is associated with the subscribed NSSAI.

The AMF node queries the subscription information of the terminal device. The first NSSAI is associated with the subscribed NSSAI, to ensure that a service provided to the terminal device by a network satisfies a subscription request.

With reference to the first aspect or any one of the first possible implementation to the third possible implementation of the first aspect, in a fourth possible implementation of the first aspect, the method further includes: receiving, by the AMF node, a registration request message from the terminal device, where the registration request message carries configured NSSAI, the first request message carries the first NSSAI, and the first NSSAI is associated with the configured NSSAI, or the first NSSAI is associated with the subscribed NSSAI and the configured NSSAI.

The AMF node receives the registration request message from the terminal device. The configured NSSAI carried by the registration request message is associated with the first NSSAI, to ensure that the network provides a service to the terminal device based on an actual requirement of the terminal device.

With reference to the first aspect or any one of the first possible implementation to the fourth possible implementation of the first aspect, in a fifth possible implementation of the first aspect, the first request message carries identification information of the terminal device.

The first request message carries the identification information of the terminal device, so that the NSSF node may autonomously query the subscription information of the terminal device, to support a scenario in which the AMF node cannot obtain the subscription information of the terminal device when there is a slice isolation requirement.

With reference to the first aspect or any one of the first possible implementation to the fifth possible implementation of the first aspect, in a sixth possible implementation of the first aspect, the response message further includes slice instance identification information corresponding to each S-NSSAI in the allowed NSSAI.

The AMF node may further obtain the slice instance identification information corresponding to each S-NSSAI in the allowed NSSAI, so that when the network deploys a plurality of slice instances based on same S-NSSAI, the AMF node may obtain a correct slice instance and a network function in the slice instance based on S-NSSAI requested by the terminal device, to provide a service to the terminal device.

With reference to the first aspect or any one of the first possible implementation to the sixth possible implementation of the first aspect, in a seventh possible implementation of the first aspect, the method further includes: obtaining, by the AMF node, registration area information of the terminal device; and determining, by the AMF node based on the allowed NSSAI of the terminal device and the service area information corresponding to the allowed NSSAI that are obtained and the registration area information of the terminal device, attribute information of a slice instance corresponding to each S-NSSAI in the allowed NSSAI, where the attribute information is used to indicate whether a service area of the slice instance corresponding to the S-NSSAI includes a registration area of the terminal device.

Based on the registration area information of the terminal device, the AMF node can know whether the service area of the slice instance corresponding to each S-NSSAI in the allowed NSSAI includes the registration area of the terminal device, to ensure that a proper target AMF node can be selected for the terminal device.

With reference to the first aspect or the seventh possible implementation of the first aspect, in an eighth possible implementation of the first aspect, first S-NSSAI is S-NSSAI that is of the allowed NSSAI and that corresponds to a service area that includes the registration area of the terminal device, and the method further includes: sending, by the AMF node, a second request message to an NRF device, where the second request message includes the first S-NSSAI or slice instance identification information corresponding to the first S-NSSAI; receiving, by the AMF, address information of a target AMF node from the NRF device; and sending, by the AMF, the allowed NSSAI and the service area information corresponding to the allowed NSSAI to the target AMF node based on the address information of the target AMF node.

The AMF node determines, by using the NRF device, the target AMF node serving the terminal device, and sends the allowed NSSAI and the service area information corresponding to the allowed NSSAI that are obtained to the target AMF node, so that the target AMF node selects a proper slice instance after receiving a session setup request from the terminal device.

With reference to the first aspect or the eighth possible implementation of the first aspect, in a ninth possible implementation of the first aspect, the method further includes: sending, by the AMF, the slice instance identification information corresponding to each S-NSSAI in the allowed NSSAI to the target AMF node.

The AMF node determines, by using the NRF device, the target AMF node serving the terminal device, and sends the slice instance identification information corresponding to each S-NSSAI in the allowed NSSAI to the target AMF node, so that the target AMF node selects a proper slice instance after receiving a session setup request from the terminal device.

With reference to the first aspect or the eighth possible implementation of the first aspect, in a tenth possible implementation of the first aspect, the method further includes: sending, by the AMF node, the attribute information to the target AMF node.

The AMF node determines, by using the NRF device, the target AMF node serving the terminal device, and sends the attribute information of the slice instance corresponding to each S-NSSAI in the allowed NSSAI to the target AMF node, so that the target AMF node selects a proper slice instance after receiving a session setup request from the terminal device.

With reference to the first aspect or any one of the first possible implementation to the tenth possible implementation of the first aspect, in an eleventh possible implementation of the first aspect, the allowed NSSAI is NSSAI of a visited public land mobile network (VPLMN), and the response message further includes NSSAI of a home public land mobile network (HPLMN) that corresponds to the NSSAI of the VPLMN, or the response message further includes NSSAI of an HPLMN that corresponds to the NSSAI of the VPLMN, and slice instance identification information corresponding to each S-NSSAI in the NSSAI of the HPLMN.

According to a second aspect, a slice-based communications method is provided. The method includes: receiving, by an NSSF node, a first request message from an access and AMF node; and sending, by the NSSF node, a response message to the AMF node, where the response message carries NSSAI, or the NSSAI and service area information corresponding to the NSSAI.

The NSSF node sends the NSSAI, or the NSSAI and the service area information corresponding to the NSSAI to the AMF node by using the response message. This can avoid repeated interaction between the AMF node and the NSSF node, improve signaling exchange and processing efficiency, and reduce system overheads.

With reference to the second aspect, in a first possible implementation of the second aspect, the NSSAI is allowed NSSAI.

The NSSF node may directly send the allowed NSSAI, so that the AMF node can directly obtain the allowed NSSAI of a terminal device, thereby reducing signaling overheads of the AMF node.

With reference to the second aspect or the first possible implementation of the second aspect, in a second possible implementation of the second aspect, the first request message carries first NSSAI, and the allowed NSSAI is associated with the first NSSAI; and the first NSSAI is associated with subscribed NSSAI, or the first NSSAI is associated with configured NSSAI, or the first NSSAI is associated with the subscribed NSSAI and the configured NSSAI.

The first NSSAI carried by the first request message is obtained by the AMF node by querying subscription information of the terminal device and using the association between the first NSSAI and the subscribed NSSAI. This can increase a quantity of NSSAI that can be supported by the terminal device.

With reference to the second aspect or the first possible implementation of the second aspect, in a third possible implementation of the second aspect, the first request message carries identification information of the terminal device, and the method further includes: querying, by the NSSF node, subscription information of the terminal device based on the identification information, where the subscription information includes subscribed NSSAI of the terminal device, and the allowed NSSAI is associated with the subscribed NSSAI.

When the first request message carries the identification information of the terminal device, the NSSF node queries the subscription information of the terminal device. The first NSSAI is associated with the subscribed NSSAI, so that a quantity of NSSAI that can be supported by the terminal device can be increased.

With reference to the second aspect, in a fourth possible implementation of the second aspect, the first request message carries first NSSAI, and the NSSAI is the first NSSAI; and the first NSSAI is associated with subscribed NSSAI, or the first NSSAI is associated with configured NSSAI, or the first NSSAI is associated with the subscribed NSSAI and the configured NSSAI.

The first NSSAI carried by the first request message is obtained by the AMF node by querying subscription information of the terminal device and using the association between the first NSSAI and the subscribed NSSAI. This can increase a quantity of NSSAI that can be supported by the terminal device.

With reference to the second aspect or the fourth possible implementation of the second aspect, in a fifth possible implementation of the second aspect, the first request message carries identification information of the terminal device, and the method further includes: querying, by the NSSF node, subscription information of the terminal device based on the identification information, where the subscription information includes the subscribed NSSAI of the terminal device, and the first NSSAI is associated with the subscribed NSSAI.

When the first request message carries the identification information of the terminal device, the NSSF node queries the subscription information of the terminal device. The first NSSAI is associated with the subscribed NSSAI, so that a quantity of NSSAI that can be supported by the terminal device can be increased.

With reference to the second aspect or any one of the second possible implementation to the fifth possible implementation of the first aspect and the first possible implementation to the fifth possible implementation of the second aspect, in a sixth possible implementation of the second aspect, the subscription information of the terminal device further includes a type of the terminal device, and the first request message further includes the type of the terminal device.

The first request message carries the identification information of the terminal device, so that the NSSF node may autonomously query the subscription information of the terminal. This reduces a quantity of times the AMF node queries the subscription information, and system overheads.

With reference to the second aspect or any one of the first possible implementation to the sixth possible implementation of the second aspect, in a seventh possible implementation of the second aspect, the response message further carries slice instance identification information corresponding to each S-NSSAI in the NSSAI.

The response message carries slice instance identification information corresponding to each S-NSSAI in the allowed NSSAI, thereby avoiding repeated interaction between the AMF node and the NSSF node, and reducing signaling overheads.

With reference to the second aspect or any one of the first possible implementation to the seventh possible implementation of the second aspect, in an eighth possible implementation of the second aspect, the NSSAI is NSSAI of a VPLMN, and the response message further includes NSSAI of an HPLMN that corresponds to the NSSAI of the VPLMN, or the response message further includes NSSAI of an HPLMN that corresponds to the NSSAI of the VPLMN, and slice instance identification information corresponding to each S-NSSAI in the NSSAI of the HPLMN.

With reference to the second aspect, in a ninth possible implementation of the second aspect, the method further includes: sending, by the NSSF, a correspondence between NSSAI and a service area of the NSSAI to the AMF.

The correspondence between NSSAI and a service area is sent to the AMF node, to avoid that the correspondence between NSSAI and a service area is obtained each time the AMF node receives a registration request message of the terminal device, thereby reducing system overheads.

According to a third aspect, a slice-based communications device is provided. The device includes: a transceiver and a processor, where the processor is configured to control the transceiver to send a first request message to an NSSF node; and the processor is further configured to: control the transceiver to receive a response message from the NSSF node, and obtain, based on the response message, allowed NSSAI of a terminal device and service area information corresponding to the allowed NSSAI.

With reference to the third aspect, in a first possible implementation of the third aspect, when obtaining, based on the response message, the allowed NSSAI of the terminal device and the service area information corresponding to the allowed NSSAI, the processor is specifically configured to: when the response message carries the allowed NSSAI and the service area information corresponding to the allowed NSSAI, obtain the allowed NSSAI and the service area information corresponding to the allowed NSSAI from the response message; or when the response message carries the allowed NSSAI, obtain the allowed NSSAI from the response message, and obtain, based on a correspondence between NSSAI and a service area, the service area information corresponding to the allowed NSSAI; or when the response message carries first NSSAI and service area information corresponding to the first NSSAI, determine, based on the first NSSAI and the service area information corresponding to the first NSSAI, the allowed NSSAI and the service area information corresponding to the allowed NSSAI.

With reference to the third aspect or the first possible implementation of the third aspect, in a second possible implementation of the third aspect, when the response message carries the allowed NSSAI, when obtaining, based on the correspondence between NSSAI and a service area of the NSSAI, the allowed NSSAI and the service area information corresponding to the allowed NSSAI, the processor is further configured to: obtain the correspondence between NSSAI and a service area from the NSSF node.

With reference to the third aspect or either of the first possible implementation and the second possible implementation of the third aspect, in a third possible implementation of the third aspect, the processor is further configured to: query subscription information of the terminal device, where the subscription information includes subscribed NSSAI of the terminal device, the first request message carries the first NSSAI, and the first NSSAI is associated with the subscribed NSSAI.

With reference to the third aspect or any one of the first possible implementation to the third possible implementation of the third aspect, in a fourth possible implementation of the third aspect, the processor is further configured to: control the transceiver to receive a registration request message from the terminal device, where the registration request message carries configured NSSAI, the first request message carries the first NSSAI, and the first NSSAI is associated with the configured NSSAI, or the first NSSAI is associated with the subscribed NSSAI and the configured NSSAI.

With reference to the third aspect or any one of the first possible implementation to the fourth possible implementation of the third aspect, in a fifth possible implementation of the third aspect, the first request message carries identification information of the terminal device.

With reference to the third aspect or any one of the first possible implementation to the fifth possible implementation of the third aspect, in a sixth possible implementation of the third aspect, the response message further includes slice instance identification information corresponding to each S-NSSAI in the allowed NSSAI.

With reference to the third aspect or any one of the first possible implementation to the sixth possible implementation of the third aspect, in a seventh possible implementation of the third aspect, the processor is further configured to:

obtain registration area information of the terminal device; and determine, based on the allowed NSSAI of the terminal device and the service area information corresponding to the allowed NSSAI that are obtained and the registration area information of the terminal device, attribute information of a slice instance corresponding to each S-NSSAI in the allowed NSSAI, where the attribute information is used to indicate whether a service area of the slice instance corresponding to the S-NSSAI includes a registration area of the terminal device.

With reference to the third aspect or the seventh possible implementation of the third aspect, in an eighth possible implementation of the third aspect, when first S-NSSAI is S-NSSAI that is of the allowed NSSAI and that corresponds to a service area that includes the registration area of the terminal device, the processor is further configured to:

control the transceiver to send a second request message to an NRF device, where the second request message includes the first S-NSSAI or slice instance identification information corresponding to the first S-NSSAI;

control the transceiver to receive address information of a target AMF node from the NRF device; and control the transceiver to send the allowed NSSAI and the service area information corresponding to the allowed NSSAI to the target AMF node based on the address information of the target AMF node.

With reference to the third aspect or the eighth possible implementation of the third aspect, in a ninth possible implementation of the third aspect, the processor is further configured to:

control the transceiver to send slice instance identification information corresponding to each S-NSSAI in the allowed NSSAI to the target AMF node.

With reference to the third aspect or the eighth possible implementation of the third aspect, in a tenth possible implementation of the third aspect, the processor is further configured to:

control the transceiver to send the attribute information to the target AMF node.

With reference to the third aspect or any one of the first possible implementation to the tenth possible implementation of the third aspect, in an eleventh possible implementation of the third aspect, the allowed NSSAI is NSSAI of a VPLMN, and the response message further includes NSSAI of an HPLMN that corresponds to the NSSAI of the VPLMN, or the response message further includes NSSAI of an HPLMN that corresponds to the NSSAI of the VPLMN, and slice instance identification information corresponding to each S-NSSAI in the NSSAI of the HPLMN.

According to a fourth aspect, a slice-based communications device is provided. The device includes: a transceiver and a processor, where the processor is configured to control the transceiver to receive a first request message from an AMF node; and the processor is further configured to control the transceiver to send a response message to the AMF node, where the response message carries NSSAI, or the NSSAI and service area information corresponding to the NSSAI.

With reference to the fourth aspect, in a first possible implementation of the fourth aspect, the NSSAI is allowed NSSAI.

With reference to the fourth aspect or the first possible implementation of the fourth aspect, in a second possible implementation of the fourth aspect, the first request message carries first NSSAI, and the allowed NSSAI is associated with the first NSSAI; and the first NSSAI is associated with subscribed NSSAI, or the first NSSAI is associated with configured NSSAI, or the first NSSAI is associated with the subscribed NSSAI and the configured NSSAI.

With reference to the fourth aspect or the first possible implementation of the fourth aspect, in a third possible implementation of the fourth aspect, the first request message carries identification information of a terminal device; and the processor is further configured to:

query subscription information of the terminal device based on the identification information, where the subscription information includes subscribed NSSAI of the terminal device, and the allowed NSSAI is associated with the subscribed NSSAI.

With reference to the fourth aspect, in a fourth possible implementation of the fourth aspect, the first request message carries first NSSAI, and the NSSAI is the first NSSAI; and the first NSSAI is associated with subscribed NSSAI, or the first NSSAI is associated with configured NSSAI, or the first NSSAI is associated with the subscribed NSSAI and the configured NSSAI.

With reference to the fourth aspect or the fourth possible implementation of the fourth aspect, in a fifth possible implementation of the fourth aspect, the first request message carries identification information of a terminal device; and the processor is further configured to:

query subscription information of the terminal device based on the identification information, where the subscription information includes the subscribed NSSAI of the terminal device, and the first NSSAI is associated with the subscribed NSSAI.

With reference to the fourth aspect or any one of the second possible implementation to the fifth possible implementation of the fifth aspect and the first possible implementation to the fifth possible implementation of the fourth aspect, in a sixth possible implementation of the fourth aspect, the subscription information of the terminal device further includes a type of the terminal device, and the first request message further includes the type of the terminal device.

With reference to the fourth aspect or any one of the first possible implementation to the sixth possible implementation of the fourth aspect, in a seventh possible implementation of the fourth aspect, the response message further carries slice instance identification information corresponding to each S-NSSAI in the NSSAI.

With reference to the fourth aspect or any one of the first possible implementation to the seventh possible implementation of the fourth aspect, in an eighth possible implementation of the fourth aspect, the NSSAI is NSSAI of a VPLMN, and the response message further includes NSSAI of an HPLMN that corresponds to the NSSAI of the VPLMN, or the response message further includes NSSAI of an HPLMN that corresponds to the NSSAI of the VPLMN, and slice instance identification information corresponding to each S-NSSAI in the NSSAI of the HPLMN.

With reference to the fourth aspect, in a ninth possible implementation of the fourth aspect, the processor is further configured to:

control the transceiver to send a correspondence between NSSAI and a service area of the NSSAI to the AMF.

According to a fifth aspect, a computer storage medium is provided. The computer storage medium is configured to store a computer software instruction executed by the processor provided in the fifth aspect, to perform the method provided in the first aspect and the possible implementations of the first aspect.

According to an sixth aspect, a computer storage medium is provided. The computer storage medium is configured to store a computer software instruction executed by the processor provided in the sixth aspect, to perform the method provided in the second aspect and the possible implementations of the second aspect.

DESCRIPTION OF EMBODIMENTS

The following clearly describes the technical solutions in the embodiments of the present disclosure with reference to the accompanying drawings in the embodiments of the present disclosure.

Figure 1:
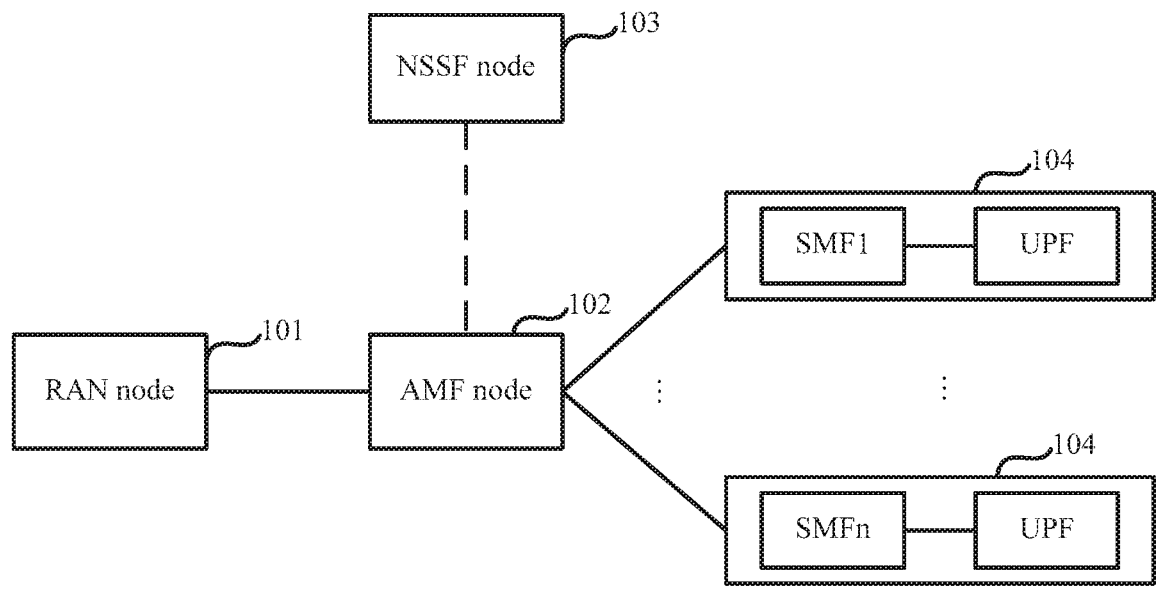
FIG. 1 is a schematic diagram of a system architecture according to an embodiment of the present disclosure.

FIG. 1 shows an example of a system architecture applied to an embodiment of the present disclosure. Slice-based communication control can be implemented based on the system architecture.

A network slice divides a physical network to a plurality of virtual networks, so that a plurality of services are implemented relatively independently while sharing a same network infrastructure. Each "network slice" performs customization and tailoring of a network function and orchestration and management of a corresponding network function based on a service scenario requirement. The network functions include a coverage area, duration, a capacity, a speed, a latency, reliability, security, availability, and the like.

A network slice may be considered as an instantiated core network architecture. Currently, the Third-Generation Partnership Project (3GPP) divides network slice instances to an enhanced mobile broadband (eMBB) service, a massive machine type communication (mMTC) service, and an ultra-reliable and low latency communications (URLLC) service. eMBB is mainly oriented to terminals having a relatively high requirement on a rate and mobility, for example, mobile phones and multi-media devices. mMTC is mainly used for an Internet of Things device, or other large-scale services having a relatively low requirement on mobility and a rate. URLLC is mainly oriented to Internet of Vehicles, or other types of services and devices having an extremely high requirement on a latency and reliability. For example, a user of a mobile phone may access a network slice of an eMBB type, to download or watch a 4K high-definition video at a high speed. A sensor device may access a network slice of mMTC to transmit a small data packet and update a system configuration. A user may simultaneously access one or more or all network slices to satisfy a service requirement and achieve relatively desirable user experience.

The system architecture of the slice-based communications method provided in this embodiment of the present disclosure includes a RAN node 101, an AMF node 102, a network slice selection function (NSSF) node 103, and a plurality of slices 104. Specific functions of each slice 104 include at least a session management function (SMF) and a user plane function (UPF). In other words, each slice 104 includes an SMF node and a UPF node. A terminal device accesses the plurality of slices by using the RAN node 101, and the AMF node 102 may provide information about a slice instance supporting the terminal device to the terminal device.

The RAN node may be an access point (AP) in a wireless local area network (WLAN), or a base transceiver station (BTS) in Global System for Mobile Communications (GSM) or Code-division multiple access (CDMA), or may be an NodeB (NodeB, NB) in Wideband Code Division Multiple Access (WCDMA), or may be an Evolved Node B (eNB or eNodeB) in Long Term Evolution (LTE), a regeneration station, an access point, an in-vehicle device, a wearable device, a network device in a future 5G network, or a network device in a future evolved public land mobile network (PLMN), for example, a base station that may connect to a 5G core network device, a transmission and reception point (TRP), a centralized processing unit (CU), a distributed processing unit (DU), or the like.

The AMF node 102 has a network function of managing access and mobility of the terminal device, communicates with a RAN, and provides a specific slice to the terminal device.

The NSSF node 103 communicates with the AMF node 102, and is configured to: select a slice supporting the terminal device for the terminal device, and transmit information about the slice supporting the terminal device to the AMF node 102.

In this embodiment of the present disclosure, the terminal device may be a device having a wireless fidelity (WiFi) module, for example, a mobile phone, a hand ring, a tablet computer, a notebook computer, an ultra-mobile personal computer (UMPC), a personal digital assistant (PDA) device, an in-vehicle device, a wearable device, a sensor having a network access function, or the like, and is not limited to only a communications terminal.

Figure 2:
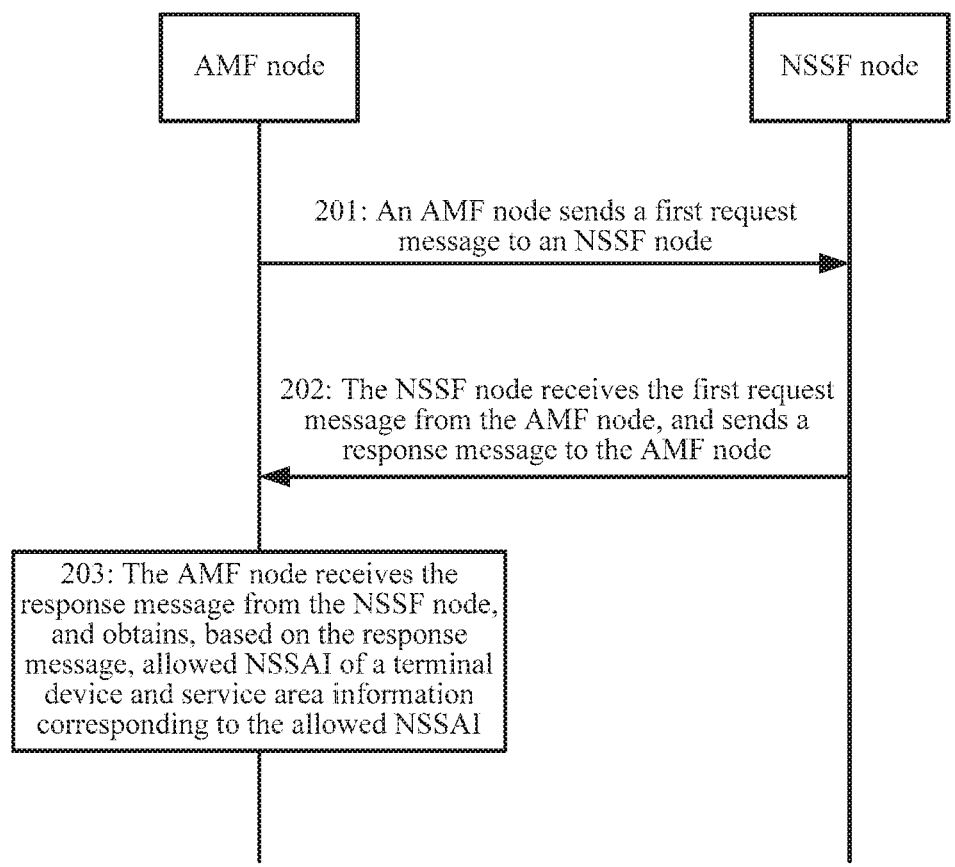
FIG. 2 is a schematic flowchart of a slice-based communications method according to an embodiment of the present disclosure.

Based on the foregoing description, FIG. 2 shows an example of a procedure of a slice-based communications method according to an embodiment of the present disclosure. Slice-based communication can be implemented in the procedure. The following describes the method for slice-based communication with reference to FIG. 1 and FIG. 2.

As shown in FIG. 2, the procedure specifically includes:

Step 201: An AMF node sends a first request message to an NSSF node.

In this embodiment of the present disclosure, after accessing a RAN node in a registration process, a terminal device needs to access a core network slice supported by the terminal device. In this case, if the AMF node selected by the RAN node cannot provide a required core network slice service to UE, the AMF node sends the first request message to the NSSF node. The first request message is used to request or query slice information associated with the terminal device. The first request message may carry first NSSAI or identification information of the terminal device. Optionally, the first request message may alternatively carry both the first NSSAI and the identification information of the terminal device. The first NSSAI carried by the first request message is used to request the NSSF node to return service area information corresponding to the first NSSAI or allowed NSSAI of the terminal device and service area information corresponding to the allowed NSSAI. The identification information of the terminal device is used by the NSSF node to query subscription information of the terminal device. The identification information of the terminal device may be carried by a registration request message that is sent by the terminal device, forwarded by the RAN node, and received by the AMF node, or may be obtained by the AMF from a context of the terminal device. The identification information of the terminal device may be a permanent identifier SUPI of the terminal device. Optionally, the registration request message may be an initial registration request message or a tracking area location update request message.

It should be noted that in this embodiment of the present disclosure, NSSAI is a set of a plurality of pieces of S-NSSAI, and one slice instance may support one piece of S-NSSAI, or may support a plurality of pieces of S-NSSAI, or one piece of S-NSSAI may correspond to one or more slice instances. When one piece of S-NSSAI corresponds to a plurality of slice instances, in this embodiment of the present disclosure, a slice instance may be determined by using a network slice instance identifier (NSI) ID.

In an implementation, the AMF node queries the subscription information of the terminal device, and adds the subscription information of the terminal device or a part of the subscription information to the first request message. For example, the AMF node may send a subscription information query request to a home UDM device of the terminal device. The subscription information query request carries an identifier of the terminal device, and is used to query the subscription information of the terminal device. The UDM device returns the subscription information of the terminal device to the AMF node, and the subscription information of the terminal device includes subscribed NSSAI of the terminal device. In this case, the AMF node determines the first NSSAI based on the subscribed NSSAI. Therefore, the first NSSAI carried by the first request message is associated with the subscribed NSSAI. In other words, the first NSSAI is related to the subscribed NSSAI of the terminal device. For example, the first NSSAI may be a universal set or a subset of the subscribed NSSAI.

Optionally, the registration request message received by the AMF node from the terminal device further carries configured NSSAI. The AMF node determines the first NSSAI based on the configured NSSAI. In this case, the first NSSAI carried by the first request message is associated with the configured NSSAI. In other words, the first NSSAI is related to the configured NSSAI. For example, the first NSSAI may be a universal set or a subset of the configured NSSAI.

Optionally, the registration request message received from the terminal device also carries the configured NSSAI while the AMF node obtains the subscribed NSSAI of the terminal device by query. The AMF node determines the first NSSAI based on the subscribed NSSAI and the configured NSSAI. In this case, the first NSSAI carried by the first request message is associated with both the subscribed NSSAI and the configured NSSAI. For example, the first NSSAI may be a universal set or a subset of the subscribed NSSAI, may be a universal set or a subset of the configured NSSAI, or may be an intersection set of the subscribed NSSAI and the configured NSSAI.

Optionally, the subscription information of the terminal device that is obtained by the AMF node by query may further include a type of the terminal device. In this case, the first request message may also further include the type of the terminal device. The type of the terminal device is used by the NSSF node to further determine slice instance identification information corresponding to each S-NSSAI in the allowed NSSAI of the terminal device.

In another implementation, when the first request message sent by the AMF node to the NSSF node carries the identification information of the terminal device, the NSSF node may autonomously query the subscription information of the terminal device from the home UDM device of the terminal device based on the identification information of the terminal device.

Step 202: The NSSF node receives the first request message from the AMF node, and sends a response message to the AMF node.

After receiving the first request message, the NSSF node sends the response message to the AMF node. The response message may carry NSSAI, or the response message may carry NSSAI and service area information corresponding to the NSSAI.

For example, step 202 may be performed in any one of the following manners:

(1) When the first request message carries the first NSSAI, the first NSSAI is associated with the subscribed NSSAI, or the first NSSAI is associated with the configured NSSAI carried by the registration request message of the terminal device, or the first NSSAI is associated with the subscribed NSSAI and the configured NSSAI. The NSSF node may determine the allowed NSSAI of the terminal device based on the first NSSAI, where the allowed NSSAI is associated with the first NSSAI. For example, the allowed NSSAI may be a universal set or a subset of the first NSSAI. In this case, the response message sent by the NSSF node to the AMF node carries NSSAI, where the NSSAI is the allowed NSSAI. Optionally, the response message may further carry the service area information corresponding to the allowed NSSAI.

(2) When the first request message carries the identification information of the terminal device, the NSSF node further queries the subscription information of the terminal device from the home UDM device of the terminal device based on the identification information of the terminal device. The subscription information may include the subscribed NSSAI of the terminal device. The NSSF node obtains the allowed NSSAI based on the subscribed NSSAI. For example, the allowed NSSAI may be a universal set or a subset of the subscribed NSSAI. In this case, the response message sent by the NSSF node to the AMF node carries NSSAI, where the NSSAI is the allowed NSSAI. Optionally, the response message may further carry the service area information corresponding to the allowed NSSAI.

(3) When the first request message carries the identification information of the terminal device and the first NSSAI, the NSSF node may query the subscription information of the terminal device from the home UDM device of the terminal device based on the identification information of the terminal device. The subscription information may include the subscribed NSSAI of the terminal device. The NSSF node obtains the allowed NSSAI based on the subscribed NSSAI and the first NSSAI. The allowed NSSAI is associated with the first NSSAI and the subscribed NSSAI. For example, the allowed NSSAI may be a universal set or a subset of the subscribed NSSAI, may be a universal set or a subset of the first NSSAI, or may be an intersection set of the subscribed NSSAI and the first NSSAI. The first NSSAI may be the configured NSSAI carried by the registration request message of the terminal device. In this case, the response message sent by the NSSF node to the AMF node carries NSSAI, where the NSSAI is the allowed NSSAI. Optionally, the response message may further carry the service area information corresponding to the allowed NSSAI.

(4) When the first request message carries the first NSSAI, the NSSAI carried by the response message may be the first NSSAI, and the response message may carry a service area corresponding to the first NSSAI.

(5) When the first request message carries the identification information of the terminal device, the NSSF node may further query the subscription information of the terminal device from the home UDM device of the terminal device based on the identification information of the terminal device. The subscription information may include the subscribed NSSAI of the terminal device. The NSSF node obtains the first NSSAI based on the subscribed NSSAI. The first NSSAI is associated with the subscribed NSSAI. For example, the first NSSAI may be a universal set or a subset of the subscribed NSSAI. The response message sent by the NSSF node to the AMF node carries the first NSSAI and the service area information corresponding to the first NSSAI.

For example, the allowed NSSAI (or the first NSSAI) carried by the response message includes S-NSSAI 1, S-NSSAI 2, and S-NSSAI 3, and the response message carries content shown in Table 1.

TABLE 1

| 1 | S-NSSAI 1 | Service Area 1 |
| 2 | S-NSSAI 2 | Service Area 2 |
| 3 | S-NSSAI 3 | Service Area 3 |

Optionally, in the foregoing several implementations, the response message may further carry slice instance identification information corresponding to each S-NSSAI in the NSSAI. For example, when the NSSAI carried by the response message is the allowed NSSAI, the response message may further carry slice instance identification information corresponding to each S-NSSAI in the allowed NSSAI. When the NSSAI carried by the response message is the first NSSAI, the response message may further carry slice instance identification information corresponding to each S-NSSAI in the first NSSAI. For example, the response message further carries slice instance identification information corresponding to S-NSSAI, as shown in Table 2.

TABLE 2

| 1 | S-NSSAI 1 | NSI ID 1 | Service Area 1 |
| 2 | S-NSSAI 2 | NSI ID 2 | Service Area 2 |
| 3 | S-NSSAI 3 | NSI ID 3 | Service Area 3 |

Optionally, when the NSSAI carried by the response message is NSSAI of a VPLMN, it indicates that the terminal device is currently in a roaming state. In this case, the response message may further include NSSAI of an HPLMN that corresponds to the NSSAI of the VPLMN. Optionally, the response message may alternatively further include the NSSAI of the HPLMN that corresponds to the NSSAI of the VPLMN, and slice instance identification information corresponding to each S-NSSAI in the NSSAI of the HPLMN. For example, in this case, the NSSF node is an NSSF node of the VPLMN. The NSSF node of the VPLMN may obtain, based on a correspondence between the NSSAI of the VPLMN and the NSSAI of the HPLMN, the NSSAI of the HPLMN that corresponds to the NSSAI of the VPLMN, to select a proper HPLMN slice instance when setup of a home routed session is supported in a roaming scenario.

Optionally, the first request message may further carry registration area information of the terminal device, and the registration area information of the terminal device is obtained by the AMF node based on location information of the RAN node. In this case, the NSSF node may determine, based on the allowed NSSAI of the terminal device and the service area information corresponding to the allowed NSSAI that are obtained and the registration area information of the terminal device, attribute information of a slice instance corresponding to each S-NSSAI in the allowed NSSAI, where the attribute information is used to indicate whether a service area of the slice instance corresponding to the S-NSSAI includes a registration area of the terminal device. The response message carries the attribute information of the slice instance corresponding to each S-NSSAI in the allowed NSSAI.

Step 203: The AMF node receives the response message from the NSSF node, and obtains, based on the response message, allowed NSSAI of a terminal device and service area information corresponding to the allowed NSSAI.

After receiving the response message from the NSSF node, the AMF node may obtain, in different manners based on different content carried by the response message, the allowed NSSAI of the terminal device and the service area information corresponding to the allowed NSSAI.

For example, the allowed NSSAI of the terminal device and the service area information corresponding to the allowed NSSAI may be obtained in any one of the following manners:

(1) When the response message carries the allowed NSSAI and the service area information corresponding to the allowed NSSAI, the AMF node may directly obtain the allowed NSSAI and the service area information corresponding to the allowed NSSAI.

(2) When the response message carries the allowed NSSAI, the AMF node obtains the allowed NSSAI, and obtains, based on a correspondence between NSSAI and a service area, the service area information corresponding to the allowed NSSAI. In this manner, the AMF node may first obtain a correspondence between NSSAI and a service area from the NSSF node, and based on the correspondence between NSSAI and a service area and the allowed NSSAI, obtain the service area information corresponding to the allowed NSSAI. Optionally, after obtaining the correspondence between NSSAI and a service area, the AMF node may locally store the correspondence, so that the correspondence is conveniently invoked at any time in usage, and no longer needs to be obtained from the NSSF node.

(3) When the response message carries the first NSSAI and the service area information corresponding to the first NSSAI, based on the first NSSAI and the service area information corresponding to the first NSSAI, the AMF node determines the allowed NSSAI and the service area information corresponding to the allowed NSSAI.

Optionally, in the foregoing several manners, the response message received by the AMF node may further carry the slice instance identification information corresponding to each S-NSSAI in the allowed NSSAI.

Optionally, the AMF node may further determine, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device. For example, in Table 1, a service area of a slice instance corresponding to S-NSSAI 1 includes the registration area of the terminal device, and a service area of a slice instance corresponding to S-NSSAI 3 does not include the registration area of the terminal device.

Optionally, after obtaining the allowed NSSAI and the service area information corresponding to the allowed NSSAI, when discovering that the AMF node is not an AMF node supported by the terminal device, the AMF node may relocate the terminal device to a target AMF node, and may further send a second request message to an NRF device. The second request message includes first S-NSSAI or an identifier of a slice instance corresponding to the first S-NSSAI. The first S-NSSAI is S-NSSAI that is of the allowed NSSAI and that corresponds to a service area that includes the registration area of the terminal device. A service area of the slice instance corresponding to the first S-NSSAI includes the registration area of the terminal device. The second request message is used to request the NRF device to return address information of the target AMF node of the terminal device. After receiving the address information of the target AMF node from the NRF device, the AMF node sends the allowed NSSAI and the service area information corresponding to the allowed NSSAI that are obtained to the target AMF node based on the address information of the target AMF node. The target AMF node stores the allowed NSSAI and the service area information corresponding to the allowed NSSAI, to determine a slice instance in response to a session setup request when receiving the session setup request of the terminal device.

Optionally, the AMF node may further send the slice instance identification information corresponding to each single network slice selection assistance information S-NSSAI in the allowed NSSAI to the target AMF node. Optionally, the AMF node may further send the attribute information of the slice instance corresponding to each S-NSSAI in the allowed NSSAI to the target AMF node. This can avoid repeated interaction between the target AMF and the NSSF node, and improve signaling exchange and processing efficiency. Optionally, the target AMF node may indicate, to the terminal device, whether each S-NSSAI in the allowed NSSAI is supported or allowed in the registration area corresponding to the terminal device, as shown in Table 5. This can avoid additional signaling overheads that are caused because a service area of requested S-NSSAI does not include the registration area, that is, the S-NSSAI is not supported in the registration area when the terminal device subsequently initiates a session request.

In the foregoing embodiment, the AMF node sends the first request message to the NSSF node; and the AMF node receives the response message from the NSSF node, and obtains, based on the response message, the allowed network slice selection assistance information NSSAI of the terminal device and the service area information corresponding to the allowed NSSAI. The AMF node obtains the allowed network slice selection assistance information NSSAI of the terminal device and the service area information corresponding to the allowed NSSAI from the NSSF node, to avoid repeated interaction between the AMF node and the NSSF node after a registration area change caused because the terminal device moves. Therefore, this improves signaling exchange and processing efficiency and reduces system overheads.

Based on the foregoing description, to better describe the embodiments of the present disclosure, the following describes, in specific implementation scenarios, a slice-based communication procedure provided in the embodiments of the present disclosure.

Figure 3:
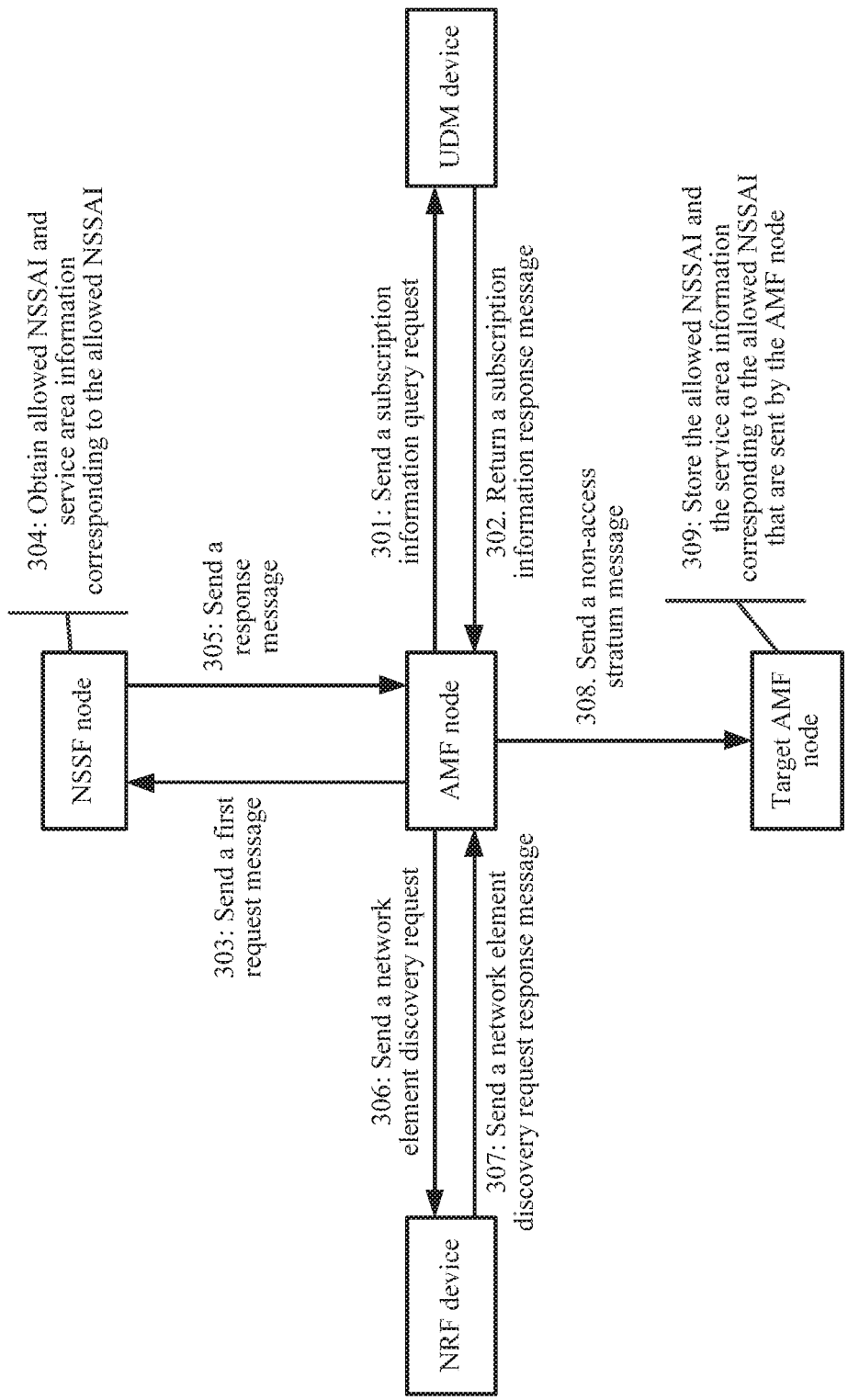
FIG. 3 is a schematic flowchart of a slice-based communications method according to an embodiment of the present disclosure.

As shown in FIG. 3, when a terminal device is in a non-roaming scenario, a slice-based communication procedure includes the following specific steps.

Step 301: An AMF node sends a subscription information query request message to a UDM device.

After receiving a registration request message that is sent by a terminal device and forwarded by a RAN, the AMF node may query subscription information of the terminal device from a UDM device. The subscription information query request message carries an SUPI of the terminal device. The subscription information of the terminal device is queried by using the SUPI of the terminal device. Optionally, the registration request message may further include configured NSSAI.

Step 302. The UDM device returns a subscription information response message to the AMF node.

The UDM device obtains the subscription information of the terminal device based on the SUPI of the terminal device that is sent by the AMF node, and returns the subscription information response message to the AMF node. The subscription information response message carries the subscription information of the terminal device. The subscription information includes subscribed NSSAI of the terminal device, and optionally may further include type information of the terminal device.

Step 303: The AMF node sends a first request message to an NSSF node.

The first request message carries first NSSAI. The first NSSAI may be obtained by the AMF node based on configured NSSAI carried by the subscription information of the terminal device and/or a registration request message of the terminal device. The first NSSAI is associated with the subscription information and/or the configured NSSAI.

Step 304: The NSSF node obtains allowed NSSAI and service area information corresponding to the allowed NSSAI.

The NSSF node may obtain, based on a correspondence between NSSAI and a service area that is obtained from an OAM system by the NSSF node, the first NSSAI, and other information, the allowed NSSAI of the terminal device and the service area information corresponding to the allowed NSSAI. The allowed NSSAI is associated with the first NSSAI, and may be a universal set or a subset of the first NSSAI.

Step 305: The NSSF node sends a response message to the AMF node.

The response message carries the allowed NSSAI and the service area information corresponding to the allowed NSSAI. Optionally, the response message may further include slice instance identification information corresponding to each S-NSSAI in the allowed NSSAI, for example, as shown in Table 1 or Table 2.

Step 306: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates whether a service area of the slice instance corresponding to the S-NSSAI or the slice instance includes the registration area of the terminal device.

Content included in the network element discovery request may be further determined based on content in the response message sent by the NSSF node. When the response message carries content shown in Table 1, content that may be carried by the network element discovery request is shown in Table 3. Assuming that a service area of a slice instance having a slice instance identifier 3 does not include the registration area of the terminal device, the network element discovery request carries only information of slice instances having slice instance identifiers 1 and 2. When the response message carries content shown in Table 2, content that may be carried by the network element discovery request is shown in Table 4. Assuming that a service area of a slice instance corresponding to slice S-NSSAI 3 does not include the registration area of the terminal device, the network element discovery request carries only information of slice S-NSSAI 1 and 2.

TABLE 3

| 1 | NSI ID 1 | Service Area 1 |
| 2 | NSI ID 2 | Service Area 2 |

TABLE 4

| 1 | S-NSSAI 1 | Service Area 1 |
| 2 | S-NSSAI 2 | Service Area 2 |

Step 307: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 308. The AMF node sends a non-access stratum message, and the allowed NSSAI and the service area information corresponding to the allowed NSSAI that are obtained by the AMF node in step 305 to a target AMF node.

The non-access stratum message is the registration request message in step 301.

Optionally, the allowed NSSAI includes the attribute information of the slice instance corresponding to each S-NSSAI in the allowed NSSAI in step 306. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 305 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 305, and the registration request message to the target AMF node.

Optionally, information that may be sent by the AMF node to the target AMF node by using the RAN node may further include the attribute information in step 306.

Step 309: The target AMF node stores the allowed NSSAI and the service area information corresponding to the allowed NSSAI that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

TABLE 5

| 1 | S-NSSAI 1 | Allowed or supported |
| 2 | S-NSSAI 2 | Allowed or supported |
| 3 | S-NSSAI 3 | Not allowed or not supported |

In this embodiment, after obtaining the allowed NSSAI and the service area information corresponding to the allowed NSSAI, the NSSF node sends the allowed NSSAI and the service area information corresponding to the allowed NSSAI to the AMF node, so that the AMF node selects a proper slice instance for the terminal device.

Figure 4:
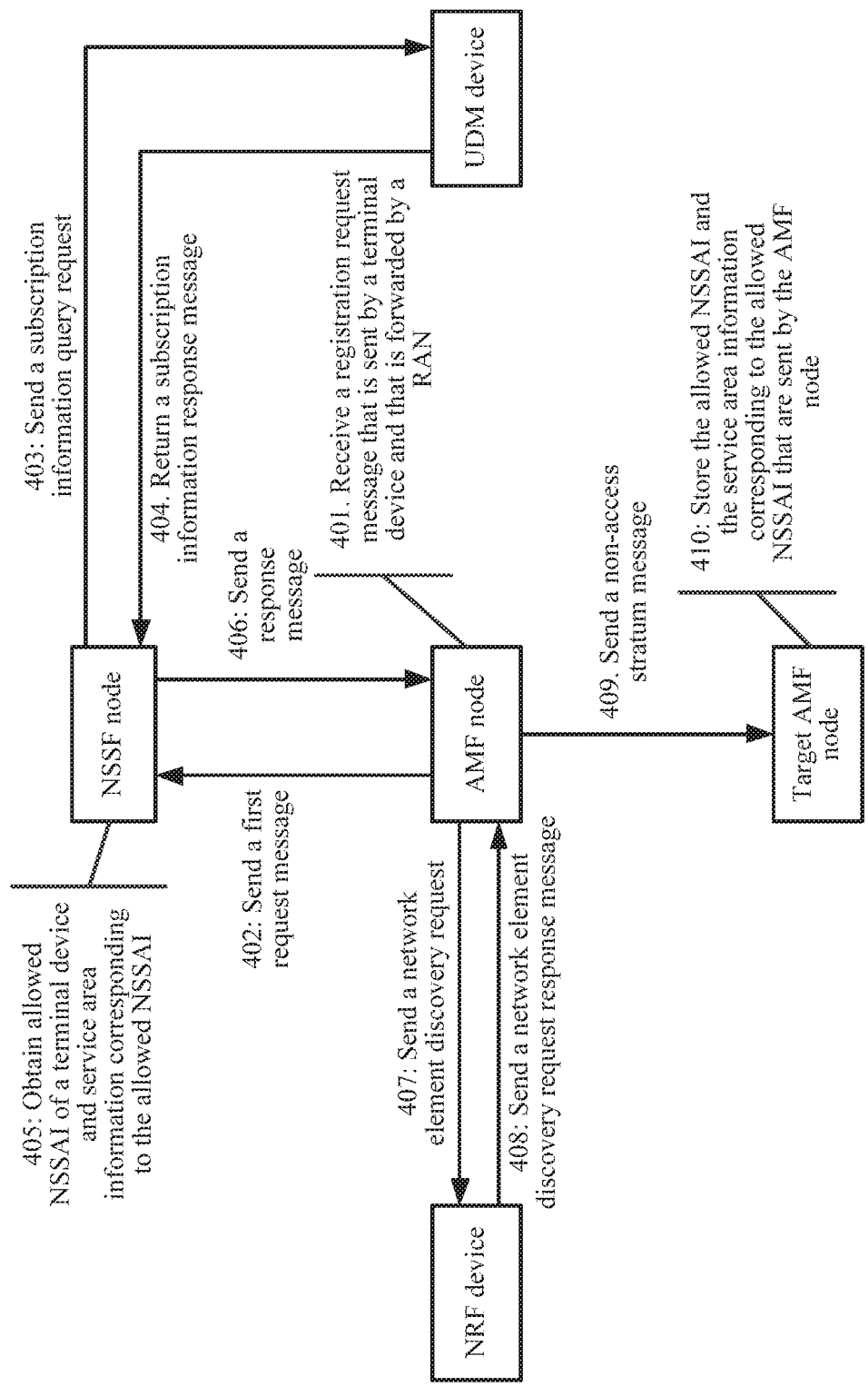
FIG. 4 is a schematic flowchart of a slice-based communications method according to an embodiment of the present disclosure.

As shown in FIG. 4, an interface is provided between an NSSF node and a UDM device, and the NSSF node and the UDM device may communicate with each other when a terminal device is in a non-roaming scenario. In the scenario, the NSSF node may autonomously query subscription information of the terminal device. In the scenario, a slice-based communication procedure includes the following specific steps.

Step 401. An AMF node receives a registration request message that is sent by a terminal device and that is forwarded by a RAN.

Step 402: The AMF node sends a first request message to an NSSF node.

When the AMF node discovers that the AMF node cannot provide a service to the terminal device, or the AMF cannot determine whether the AMF node can provide a service to the terminal device, the AMF sends the first request message. The first request message carries a SUPI of the terminal device. If the registration request message sent by the terminal device carries configured NSSAI, the first request message may further carry the configured NSSAI. If the registration request message sent by the terminal device does not carry the configured NSSAI, the first request message does not carry the configured NSSAI.

Step 403: The NSSF node sends a subscription information query request to a UDM device.

The subscription information query request includes the SUPI of the terminal device that is carried by the first request message that is sent by the AMF node and received by the NSSF node. The NSSF node queries subscription information of the terminal device from the UDM based on the SUPI of the terminal device.

Step 404. The UDM device returns a subscription information response message to the NSSF node.

The UDM device obtains the subscription information of the terminal device based on the SUPI of the terminal device that is sent by the NSSF node, and returns the subscription information response message to the NSSF node. The subscription information response message carries the subscription information of the terminal device. The subscription information includes subscribed NSSAI of the terminal device, and optionally may further include type information of the terminal device.

Step 405: The NSSF node obtains allowed NSSAI of a terminal device and service area information corresponding to the allowed NSSAI.

The NSSF node may obtain the allowed NSSAI of the terminal device and the service area information corresponding to the allowed NSSAI based on information such as a correspondence between NSSAI and a service area that is obtained from an OAM system by the NSSF node, the subscribed NSSAI carried by the subscription information of the terminal device that is obtained from the UDM, and the configured NSSAI carried by the first request message sent by the AMF node. The allowed NSSAI is associated with the subscribed NSSAI and/or the configured NSSAI, and may be a universal set or a subset of the subscribed NSSAI, a universal set or a subset of the configured NSSAI, or an intersection set of the subscribed NSSAI and the configured NSSAI.

Step 406: The NSSF node sends a response message to the AMF node.

The response message carries the allowed NSSAI and the service area information corresponding to the allowed NSSAI. Optionally, the response message may further include slice instance identification information corresponding to each S-NSSAI in the allowed NSSAI, for example, as shown in Table 1 or Table 2.

Step 407: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 1, content that may be carried by the network element discovery request is shown in Table 3. Assuming that a service area of a slice instance having a slice instance identifier 3 does not include the registration area of the terminal device, the network element discovery request carries only information of slice instances having slice instance identifiers 1 and 2. When the response message carries content shown in Table 2, content that may be carried by the network element discovery request is shown in Table 4. Assuming that a service area of a slice instance corresponding to slice S-NSSAI 3 does not include the registration area of the terminal device, the network element discovery request carries only information of slice S-NSSAI 1 and 2.

Step 408: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 409. The AMF node sends a non-access stratum message, and the allowed NSSAI and the service area information corresponding to the allowed NSSAI that are obtained by the AMF node in step 406 to a target AMF node.

The non-access stratum message is the registration request message in step 401.

Optionally, the allowed NSSAI includes the attribute information of the slice instance corresponding to each S-NSSAI in the allowed NSSAI in step 407. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 406 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 406, and the registration request message to the target AMF node.

Optionally, information that is sent by the AMF node to the target AMF node by using the RAN node may further include the attribute information in step 407.

Step 410: The target AMF node stores the allowed NSSAI and the service area information corresponding to the allowed NSSAI that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node. Compared with the embodiment shown in FIG. 3, in the embodiment shown in FIG. 4, the interface is provided between the NSSF node and the UDM device, the NSSF node may directly obtain the subscription information of the terminal device, and the first request message sent by the AMF node to the NSSF node may carry the SUPI of the terminal device.

Figure 5:
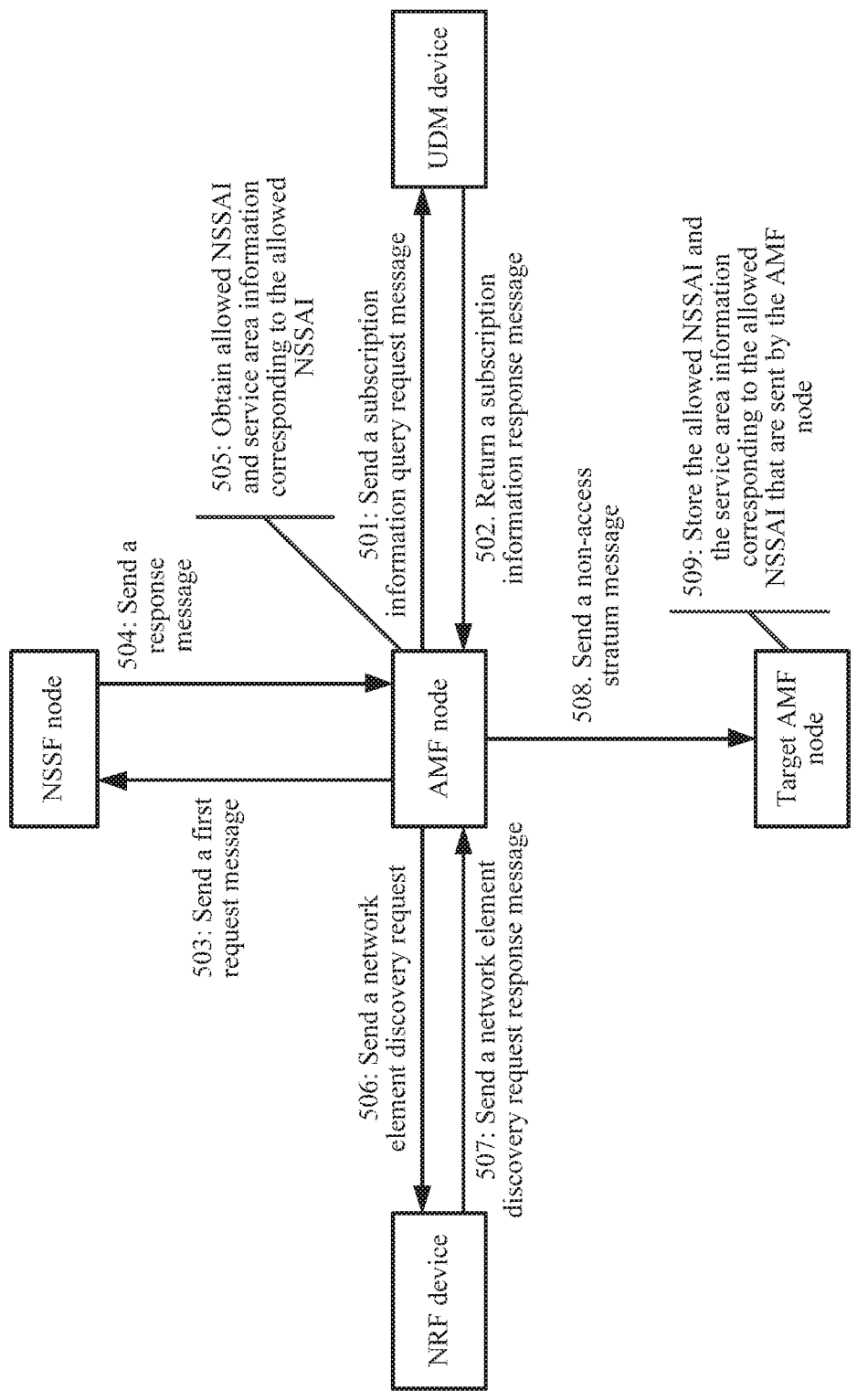
FIG. 5 is a schematic flowchart of a slice-based communications method according to an embodiment of the present disclosure.

As shown in FIG. 5, when a terminal device is in a non-roaming scenario, a slice-based communication procedure includes the following specific steps.

Step 501: An AMF node sends a subscription information query request message to a UDM device.

After receiving a registration request message that is sent by a terminal device and forwarded by a RAN, the AMF node may query subscription information of the terminal device from the UDM device. The subscription information query request message carries an SUPI of the terminal device. The subscription information of the terminal device is queried by using the SUPI of the terminal device. Optionally, the registration request message may further include configured NSSAI.

Step 502. The UDM device returns a subscription information response message to the AMF node.

The UDM device obtains the subscription information of the terminal device based on the SUPI of the terminal device that is sent by the AMF node, and returns the subscription information response message to the AMF node. The subscription information response message carries the subscription information of the terminal device. The subscription information includes subscribed NSSAI of the terminal device, and optionally may further include type information of the terminal device.

Step 503: The AMF node sends a first request message to an NSSF node.

The first request message carries first NSSAI. The first NSSAI may be obtained by the AMF node based on the configured NSSAI carried by the subscription information of the terminal device and/or the registration request message of the terminal device. The first NSSAI is associated with the subscription information and/or the configured NSSAI.

Step 504: The NSSF node sends a response message to the AMF node.

The response message carries service area information corresponding to the first NSSAI. After receiving the first request message sent by the AMF node, the NSSF node may obtain, based on a correspondence between NSSAI and a service area that is obtained from an OAM system and the first NSSAI, the service area information corresponding to the first NSSAI. Optionally, the response message may further include slice instance identification information corresponding to each S-NSSAI in the first NSSAI, for example, as shown in Table 1 or Table 2.

Step 505: The AMF node obtains allowed NSSAI and service area information corresponding to the allowed NSSAI.

Based on the service area information that corresponds to the first NSSAI and that is carried by the response message sent by an NSSAI node, the first NSSAI, and the subscribed NSSAI, the AMF node obtains the allowed NSSAI of the terminal device and the service area information corresponding to the allowed NSSAI. The allowed NSSAI is associated with the first NSSAI, or the allowed NSSAI is associated with the subscribed NSSAI.

Step 506: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 1, content that may be carried by the network element discovery request is shown in Table 3. Assuming that a service area of a slice instance having a slice instance identifier 3 does not include the registration area of the terminal device, the network element discovery request carries only information of slice instances having slice instance identifiers 1 and 2. When the response message carries content shown in Table 2, content that may be carried by the network element discovery request is shown in Table 4. Assuming that a service area of a slice instance corresponding to slice S-NSSAI 3 does not include the registration area of the terminal device, the network element discovery request carries only information of slice S-NSSAI 1 and 2.

Step 507: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 508. The AMF node sends a non-access stratum message, and the allowed NSSAI and the service area information corresponding to the allowed NSSAI that are obtained by the AMF node in step 505 to a target AMF node.

The non-access stratum message is the registration request message in step 501.

Optionally, the allowed NSSAI includes the attribute information of the slice instance corresponding to each S-NSSAI in the allowed NSSAI in step 506. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 505 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 505, and the registration request message to the target AMF node.

Optionally, information that is sent by the AMF node to the target AMF node by using the RAN node may further include the attribute information in step 506.

Step 509: The target AMF node stores the allowed NSSAI and the service area information corresponding to the allowed NSSAI that are sent by the AMF node, to determine a slice instance for a session setup request when receiving the session setup request of the terminal device.

Compared with the embodiments shown in FIG. 4 and FIG. 3, in the embodiment shown in FIG. 5, the NSSF node does not directly obtain the allowed NSSAI, and instead, the AMF node obtains the allowed NSSAI and the service area information corresponding to the allowed NSSAI.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

Figure 6:
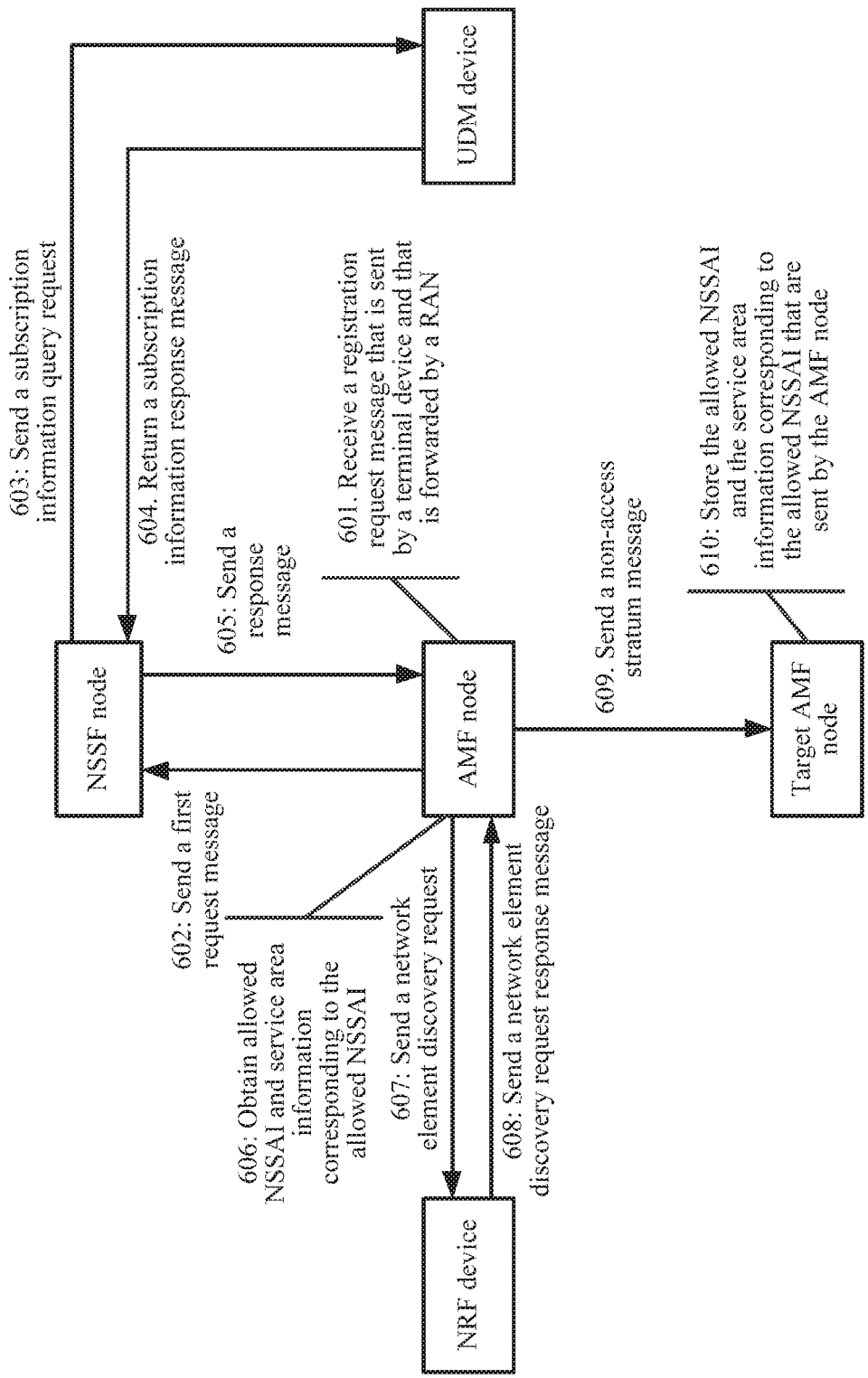
FIG. 6 is a schematic flowchart of a slice-based communications method according to an embodiment of the present disclosure.

As shown in FIG. 6, an interface is provided between an NSSF node and a UDM device, and the NSSF node and the UDM device may communicate with each other when a terminal device is in a non-roaming scenario. In the scenario, the NSSF node may autonomously query subscription information of the terminal device. In the scenario, a slice-based communication procedure includes the following specific steps.

Step 601. An AMF node receives a registration request message that is sent by a terminal device and that is forwarded by a RAN.

Step 602: The AMF node sends a first request message to an NSSF node.

When the AMF node discovers that the AMF node cannot provide a service to the terminal device, or the AMF cannot determine whether the AMF node can provide a service to the terminal device, the AMF sends the first request message. The first request message carries a SUPI of the terminal device. If the registration request message sent by the terminal device carries configured NSSAI, the first request message may further carry the configured NSSAI. If the registration request message sent by the terminal device does not carry the configured NSSAI, the first request message does not carry the configured NSSAI.

Step 603: The NSSF node sends a subscription information query request to a UDM device.

The subscription information query request includes the SUPI of the terminal device that is carried by the first request message that is sent by the AMF node and received by the NSSF node. The NSSF node queries subscription information of the terminal device from the UDM based on the SUPI of the terminal device.

Step 604. The UDM device returns a subscription information response message to the NSSF node.

The UDM device obtains the subscription information of the terminal device based on the SUPI of the terminal device that is sent by the NSSF node, and returns the subscription information response message to the NSSF node. The subscription information response message carries the subscription information of the terminal device. The subscription information includes subscribed NSSAI of the terminal device, and optionally may further include type information of the terminal device.

Step 605: The NSSF node sends a response message to the AMF node.

The response message carries service area information corresponding to first NSSAI. After receiving the first request message sent by the AMF node, the NSSF node may obtain, based on a correspondence between NSSAI and a service area that is obtained from an OAM system and the first NSSAI, the service area information corresponding to the first NSSAI. Optionally, the response message may further include slice instance identification information corresponding to each S-NSSAI in the first NSSAI, for example, as shown in Table 1 or Table 2.

Step 606: The AMF node obtains allowed NSSAI and service area information corresponding to the allowed NSSAI.

Based on the service area information that corresponds to the first NSSAI and that is carried by the response message sent by an NSSAI node, the first NSSAI, and the subscribed NSSAI, the AMF node obtains the allowed NSSAI of the terminal device and the service area information corresponding to the allowed NSSAI. The allowed NSSAI is associated with the first NSSAI, or the allowed NSSAI is associated with the subscribed NSSAI.

Step 607: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 1, content that may be carried by the network element discovery request is shown in Table 3. Assuming that a service area of a slice instance having a slice instance identifier 3 does not include the registration area of the terminal device, the network element discovery request carries only information of slice instances having slice instance identifiers 1 and 2. When the response message carries content shown in Table 2, content that may be carried by the network element discovery request is shown in Table 4. Assuming that a service area of a slice instance corresponding to slice S-NSSAI 3 does not include the registration area of the terminal device, the network element discovery request carries only information of slice S-NSSAI 1 and 2.

Step 608: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 609. The AMF node sends a non-access stratum message, and the allowed NSSAI and the service area information corresponding to the allowed NSSAI that are obtained by the AMF node in step 606 to a target AMF node.

The non-access stratum message is the registration request message in step 601.

Optionally, the allowed NSSAI includes the attribute information of the slice instance corresponding to each S-NSSAI in the allowed NSSAI in step 607. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 606 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 606, and the registration request message to the target AMF node.

Optionally, information that is sent by the AMF node to the target AMF node by using the RAN node may further include the attribute information in step 607.

Step 610: The target AMF node stores the allowed NSSAI and the service area information corresponding to the allowed NSSAI that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

Compared with the embodiment shown in FIG. 5, in the embodiment shown in FIG. 6, the interface is provided between the NSSF node and the UDM device, the NSSF node may directly obtain the subscription information of the terminal device, and the first request message sent by the AMF node to the NSSF node may carry the SUPI of the terminal device.

Figure 7:
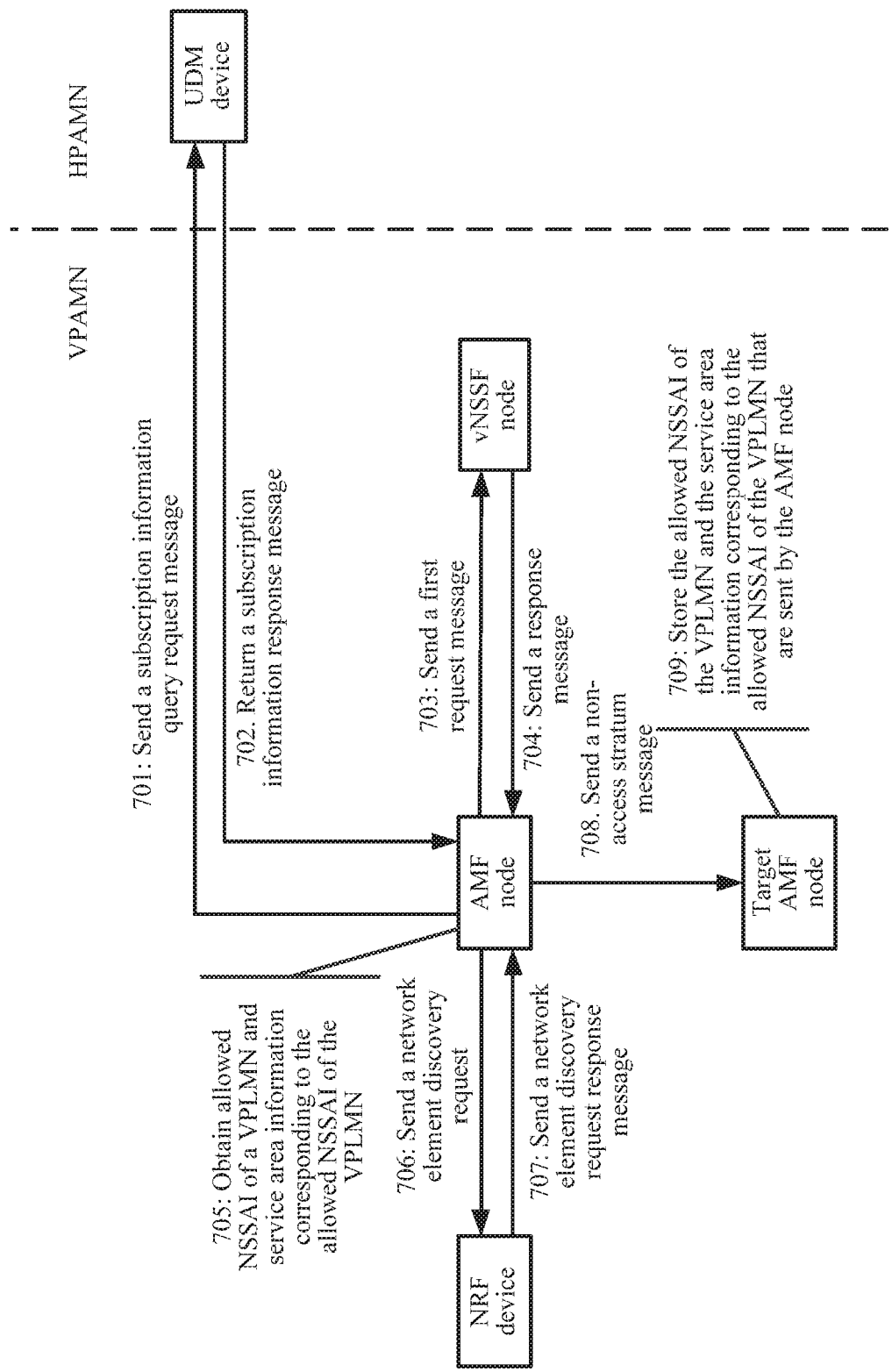
FIG. 7 is a schematic flowchart of a slice-based communications method according to an embodiment of the present disclosure.

As shown in FIG. 7, when a terminal device is in a roaming scenario, a slice-based communication procedure includes the following specific steps.

Step 701: An AMF node sends a subscription information query request message to a UDM device of an HPLMN.

After receiving a registration request message that is sent by a terminal device and forwarded by a RAN, the AMF node may query subscription information of the terminal device from the UDM device. The subscription information query request message carries an SUPI of the terminal device. The subscription information of the terminal device is queried by using the SUPI of the terminal device. Optionally, the registration request message may further include configured NSSAI of the HPLMN and configured NSSAI of a VPLMN.

Step 702. The UDM device of the HPLMN returns a subscription information response message to the AMF node.

The UDM device of the HPLMN obtains the subscription information of the terminal device based on the SUPI of the terminal device that is sent by the AMF node, and returns the subscription information response message to the AMF node. The subscription information response message carries the subscription information of the terminal device. The subscription information includes subscribed NSSAI of the HPLMN of the terminal device, and optionally may further include type information of the terminal device.

Step 703: The AMF node sends a first request message to an NSSF node.

The first request message carries first NSSAI. The first NSSAI may be obtained by the AMF node based on the configured NSSAI of the HPLMN or the configured NSSAI of the VPLMN that is carried by the subscription information of the terminal device and/or the registration request message of the terminal device. The first NSSAI is associated with the subscribed NSSAI of the HPLMN and/or the configured NSSAI of the HPLMN. Alternatively, the first NSSAI may be associated with the subscribed NSSAI of the HPLMN and/or the configured NSSAI of the VPLMN. For example, the first NSSAI may be an intersection set of the subscribed NSSAI of the HPLMN and the configured NSSAI of the HPLMN that is carried by the registration request message of the terminal device, may be the subscribed NSSAI of the HPLMN and the configured NSSAI of the HPLMN that is carried by the registration request message of the terminal device, or may be the subscribed NSSAI of the HPLMN and the configured NSSAI of the VPLMN that is carried by the registration request message of the terminal device. Optionally, the first request message further carries type information of the terminal device.

Step 704: The NSSF node sends a response message to the AMF node.

The response message carries service area information corresponding to second NSSAI. After receiving the first request message sent by the AMF node, based on a correspondence between NSSAI of the VPLMN and a service area that is obtained from an OAM system and the first NSSAI, the NSSF node may determine the second NSSAI, and obtain the service area information corresponding to the second NSSAI.

For example, if the first NSSAI includes the NSSAI of the HPLMN, the NSSF node may first map the NSSAI of the HPLMN to corresponding NSSAI of the VPLMN based on a roaming protocol, and then obtain the second NSSAI. The second NSSAI is associated with one or more pieces of NSSAI carried by the first NSSAI.

Optionally, the response message may further include NSSAI of the HPLMN that corresponds to the NSSAI of the VPLMN. For example, this may be shown in Table 6.

TABLE 6

| 1 | VPLMN S-NSSAI 1 | HPLMN S-NSSAI 1* | VPLMN Service Area 1 |
| 2 | VPLMN S-NSSAI 2 | HPLMN S-NSSAI 2* | VPLMN Service Area 2 |
| 3 | VPLMN S-NSSAI 3 | HPLMN S-NSSAI 3* | VPLMN Service Area 3 |

Step 705: The AMF node obtains allowed NSSAI of a VPLMN and service area information corresponding to the allowed NSSAI of the VPLMN.

Based on the service area information that corresponds to the second NSSAI and that is carried by the response message sent by an NSSAI node, and the second NSSAI, the AMF node obtains the allowed NSSAI of the VPLMN of the terminal device and the service area information corresponding to the allowed NSSAI of the VPLMN. The allowed NSSAI of the VPLMN is associated with the second NSSAI.

Step 706: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 6, content that may be carried by the network element discovery request is shown in Table 7. Assuming that a service area of a slice instance corresponding to S-NSSAI 3 of the VPLMN does not include the registration area of the terminal device, the network element discovery request carries only information of VPLMN S-NSSAI 1 and VPLMN S-NSSAI 2.

TABLE 7

| 1 | VPLMN S-NSSAI 1 | VPLMN Service Area 1 |
| 2 | VPLMN S-NSSAI 2 | VPLMN Service Area 2 |

Step 707: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 708. The AMF node sends a non-access stratum message, and the allowed NSSAI and the service area information corresponding to the allowed NSSAI that are obtained by the AMF node in step 705 to a target AMF node.

The non-access stratum message is the registration request message in step 701.

Optionally, the allowed NSSAI includes the attribute information of the slice instance corresponding to each S-NSSAI in the allowed NSSAI in step 706. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 705 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 705, and the registration request message to the target AMF node.

Optionally, information that is sent by the AMF node to the target AMF node by using the RAN node may further include the attribute information in step 706.

Step 709: The target AMF node stores the allowed NSSAI of the VPLMN and the service area information corresponding to the allowed NSSAI of the VPLMN that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

In the embodiment shown in FIG. 7, in step 705, the AMF node determines the allowed NSSAI of the VPLMN for the terminal device. In another implementation further provided in this embodiment of the present disclosure, the NSSF node may further determine the allowed NSSAI of the VPLMN for the terminal device in step 704, and send the allowed NSSAI of the VPLMN that is determined to the AMF node by using the response message. For a specific implementation of this procedure, refer to related steps in the embodiment shown in FIG. 4 or FIG. 6. Details are not described herein again.

Figure 8:
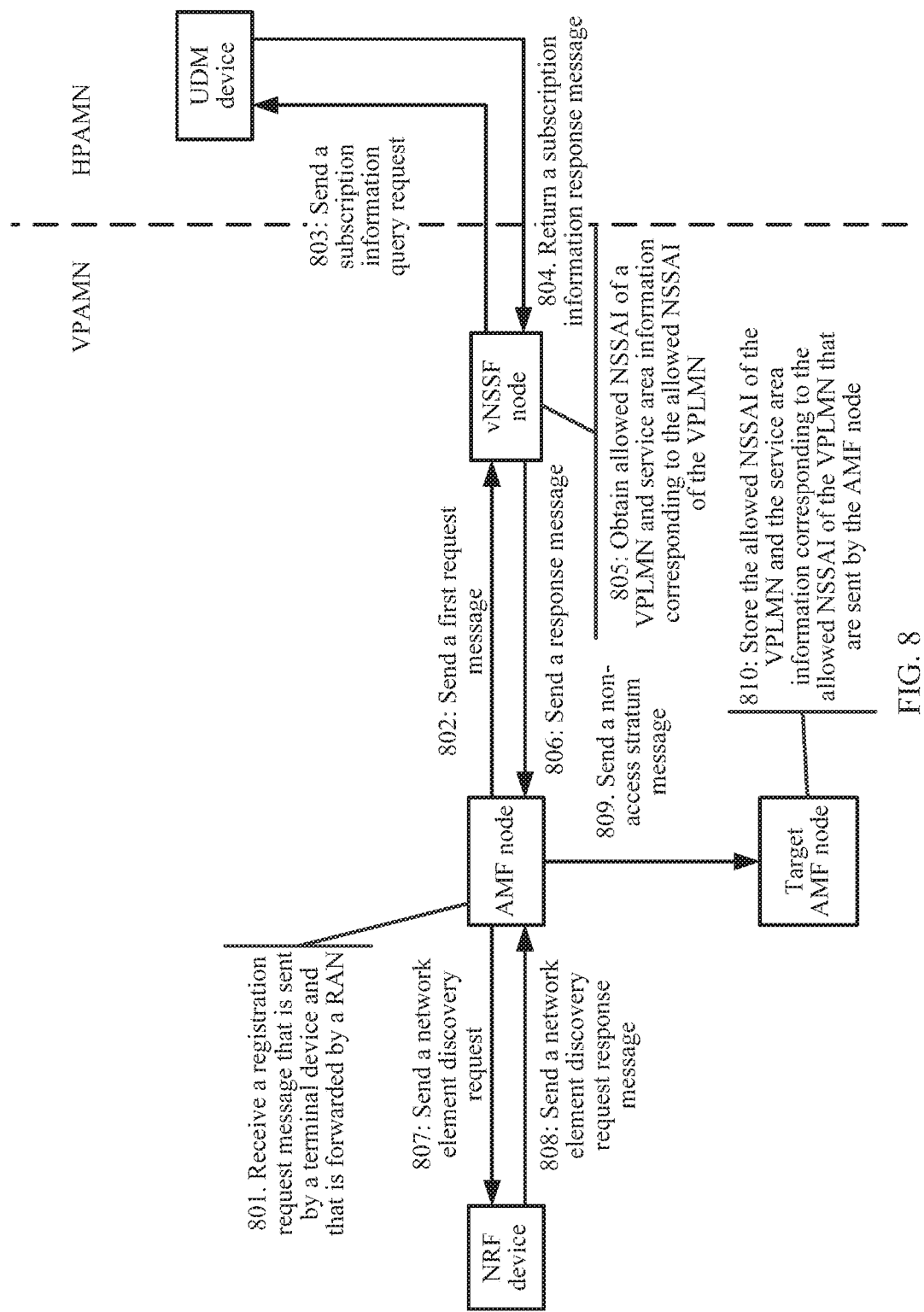
FIG. 8 is a schematic flowchart of a slice-based communications method according to an embodiment of the present disclosure.

As shown in FIG. 8, when a terminal device is in a roaming scenario, a slice-based communication procedure includes the following specific steps.

Step 801. An AMF node receives a registration request message that is sent by a terminal device and that is forwarded by a RAN.

Step 802: The AMF node sends a first request message to an NSSF node.

When the AMF node discovers that the AMF node cannot provide a service to the terminal device, or the AMF cannot determine whether the AMF node can provide a service to the terminal device, the AMF sends the first request message. The first request message carries a SUPI of the terminal device. If the registration request message sent by the terminal device carries configured NSSAI of an HPLMN or configured NSSAI of a VPLMN, the first request message may further carry the configured NSSAI. If the registration request message sent by the terminal device does not carry the configured NSSAI, the first request message does not carry the configured NSSAI.

Step 803: The NSSF node sends a subscription information query request to a UDM device of an HPLMN.

The subscription information query request includes the SUPI of the terminal device that is carried by the first request message that is sent by the AMF node and received by the NSSF node. The NSSF node queries subscription information of the terminal device from the UDM of the HPLMN based on the SUPI of the terminal device.

Step 804. The UDM device of the HPLMN returns a subscription information response message to the NSSF node.

The UDM device obtains the subscription information of the terminal device based on the SUPI of the terminal device that is sent by the NSSF node, and returns the subscription information response message to the NSSF node. The subscription information response message carries the subscription information of the terminal device. The subscription information includes the subscribed NSSAI of the HPLMN, and optionally may further include type information of the terminal device.

Step 805: The NSSF node obtains allowed NSSAI of a VPLMN and service area information corresponding to the allowed NSSAI of the VPLMN.

The NSSF node may obtain the allowed NSSAI of the VPLMN of the terminal device and the service area information corresponding to the allowed NSSAI of the VPLMN based on information such as a correspondence between the NSSAI of the VPLMN and a service area that is obtained from an OAM system by the NSSF node, the subscribed NSSAI of the HPLMN that is carried by the subscription information of the terminal device that is obtained from the UDM of the HPLMN, and the configured NSSAI of the HPLMN or the configured NSSAI of the VPLMN that is carried by the first request message sent by the AMF node. The allowed NSSAI of the VPLMN is associated with the subscribed NSSAI of the HPLMN and/or the configured NSSAI of the HPLMN. Alternatively, the allowed NSSAI of the VPLMN may be associated with the subscribed NSSAI of the HPLMN and/or the configured NSSAI of the VPLMN. For example, before obtaining the allowed NSSAI of the VPLMN, the NSSF node may map the subscribed NSSAI of the HPLMN to corresponding NSSAI of the VPLMN based on a roaming protocol. If the first request message carries the configured NSSAI of the HPLMN, the NSSF node may further map the configured NSSAI of the HPLMN to the NSSAI of the VPLMN.

Step 806: The NSSF node sends a response message to the AMF node.

The response message carries the allowed NSSAI of the VPLMN and the service area information corresponding to the allowed NSSAI of the VPLMN. Optionally, the response message may further include the NSSAI of the HPLMN that corresponds to the NSSAI of the VPLMN. For example, this may be shown in Table 6.

Step 807: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 6, content that may be carried by the network element discovery request is shown in Table 7. Assuming that a service area of a slice instance corresponding to S-NSSAI 3 of the VPLMN does not include the registration area of the terminal device, the network element discovery request carries only information of VPLMN S-NSSAI 1 and VPLMN S-NSSAI 2.

Step 808: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 809. The AMF node sends a non-access stratum message, and allowed NSSAI and service area information corresponding to the allowed NSSAI that are obtained by the AMF node in step 806 to a target AMF node.

The non-access stratum message is the registration request message in step 801.

Optionally, the allowed NSSAI includes the attribute information of the slice instance corresponding to each S-NSSAI in the allowed NSSAI in step 807. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 806 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 806, and the registration request message to the target AMF node.

Optionally, information that is sent by the AMF node to the target AMF node by using the RAN node may further include the attribute information in step 807.

Step 810: The target AMF node stores the allowed NSSAI of the VPLMN and the service area information corresponding to the allowed NSSAI of the VPLMN that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

In the embodiment shown in FIG. 8, the NSSF node determines the allowed NSSAI of the VPLMN for the terminal device. In another embodiment, the AMF node may further determine the allowed NSSAI of the VPLMN after step 807 and before step 808. For specific implementation steps, refer to steps described in the embodiment shown in FIG. 3 or FIG. 5. Details are not described herein again.

Figure 9:
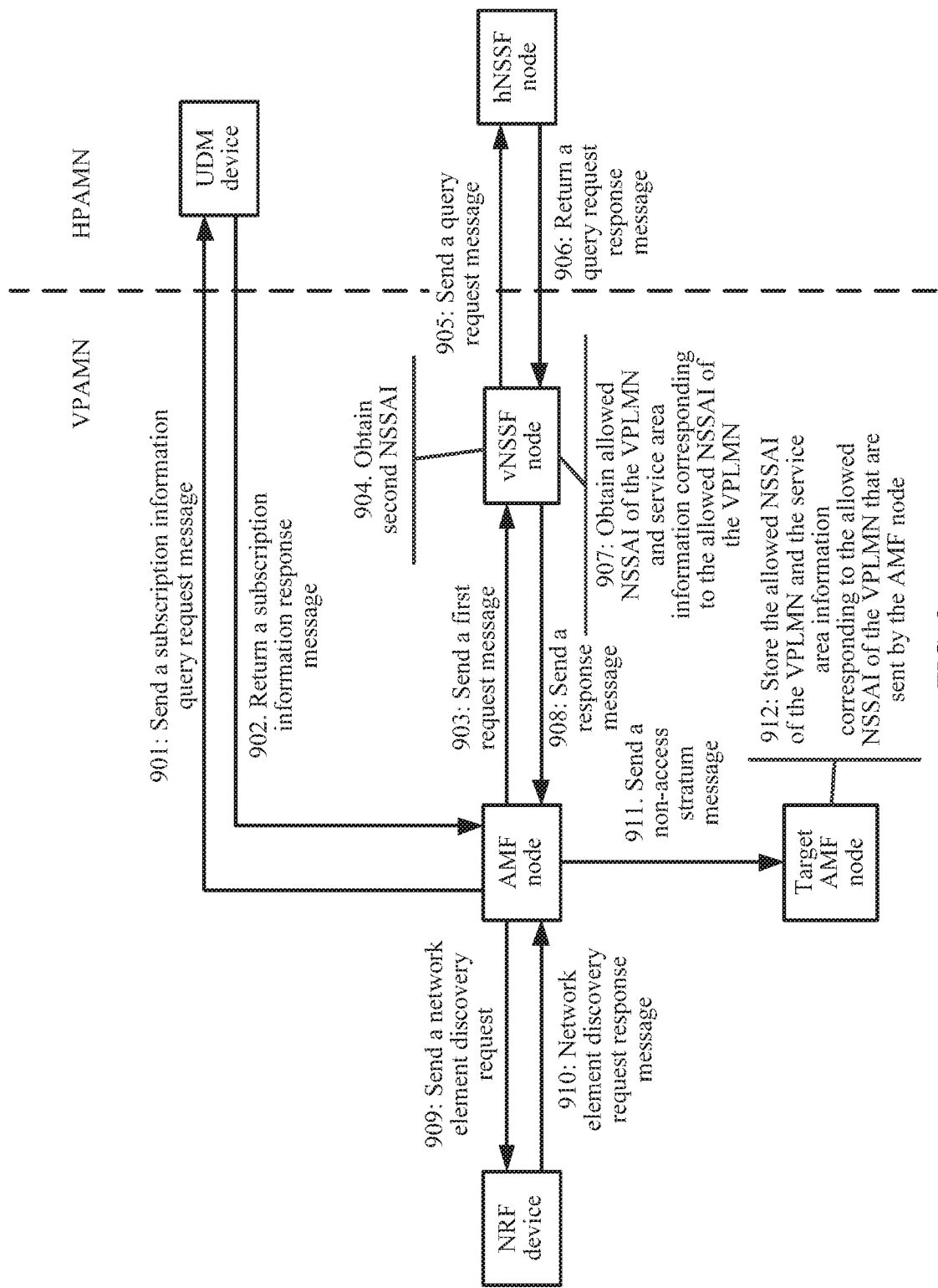
FIG. 9 is a schematic flowchart of a slice-based communications method according to an embodiment of the present disclosure.

As shown in FIG. 9, when a terminal device is in a roaming scenario, a slice-based communication procedure includes the following specific steps.

Step 901: An AMF node sends a subscription information query request message to a UDM device of an HPLMN.

After receiving a registration request message that is sent by a terminal device and forwarded by a RAN, the AMF node may query subscription information of the terminal device from the UDM device. The subscription information query request message carries an SUPI of the terminal device. The subscription information of the terminal device is queried by using the SUPI of the terminal device. Optionally, the registration request message may further include configured NSSAI of the HPLMN and configured NSSAI of a VPLMN.

Step 902. The UDM device of the HPLMN returns a subscription information response message to the AMF node.

The UDM device of the HPLMN obtains the subscription information of the terminal device based on the SUPI of the terminal device that is sent by the AMF node, and returns the subscription information response message to the AMF node. The subscription information response message carries the subscription information of the terminal device. The subscription information includes subscribed NSSAI of the HPLMN of the terminal device, and optionally may further include type information of the terminal device.

Step 903: The AMF node sends a first request message to an NSSF node of a VPLMN.

The first request message carries first NSSAI. The first NSSAI may be obtained by the AMF node based on the configured NSSAI of the HPLMN or the configured NSSAI of the VPLMN that is carried by the subscription information of the terminal device and/or the registration request message of the terminal device. The first NSSAI is associated with the subscribed NSSAI of the HPLMN and/or the configured NSSAI of the HPLMN. Alternatively, the first NSSAI may be associated with the subscribed NSSAI of the HPLMN and/or the configured NSSAI of the VPLMN.

Step 904. The NSSF node of the VPLMN obtains second NSSAI.

After receiving the first request message sent by the AMF node, the NSSF node of the VPLMN may obtain the second NSSAI based on a correspondence between NSSAI of the VPLMN and a service area that is obtained from an OAM system and the first NSSAI. For example, the NSSF node of the VPLMN may determine, based on the correspondence between NSSAI of the VPLMN and a service area, whether VPLMN S-NSSAI corresponding to S-NSSAI indicated by the subscribed NSSAI of the HPLMN of the terminal device is supported by the terminal device, to obtain the second NSSAI.

Step 905: The NSSF node of the VPLMN sends a query request message to an NSSF node of the HPLMN.

The query request message carries the second NSSAI. Optionally, the query request message may further include the type information of the terminal device.

Step 906: The NSSF node of the HPLMN returns a query request response message to the NSSF node of the VPLMN.

The query request response message includes information corresponding to the second NSSAI. For example, the information corresponding to the second NSSAI may include slice instance identification information of the HPLMN that corresponds to each S-NSSAI in the second NSSAI, and further includes corresponding S-NSSAI of the VPLMN, as shown in Table 7.

TABLE 7

| 1 | VPLMN S-NSSAI 1 | HPLMN S-NSSAI 1* | HPLMN NSI ID 1* |
| 2 | VPLMN S-NSSAI 2 | HPLMN S-NSSAI 2* | HPLMN NSI ID 1* |
| 3 | VPLMN S-NSSAI 3 | HPLMN S-NSSAI 3* | HPLMN NSI ID 1* |

Step 907: The NSSF node of the VPLMN obtains allowed NSSAI of the VPLMN and service area information corresponding to the allowed NSSAI of the VPLMN.

The NSSF node of the VPLMN obtains, based on the second NSSAI and the information corresponding to the second NSSAI that are returned from the NSSF node of the HPLMN, the allowed NSSAI of the VPLMN of the terminal device and the service area information corresponding to the allowed NSSAI of the VPLMN.

Step 908: The NSSF node of the VPLMN sends a response message to the AMF node.

The response message carries the allowed NSSAI of the VPLMN and the service area information corresponding to the allowed NSSAI of the VPLMN. The response message may further include NSSAI of the HPLMN that corresponds to the NSSAI of the VPLMN, and slice instance identification information corresponding to each S-NSSAI in the NSSAI of the HPLMN. For example, this may be shown in Table 8.

TABLE 8

| 1 | VPLMN S-NSSAI 1 | HPLMN S-NSSAI 1* | VPLMN NSI ID 1 | HPLMN NSI ID 1* | VPLMN Service Area 1 |
| 2 | VPLMN S-NSSAI 2 | HPLMN S-NSSAI 2* | VPLMN NSI ID 2 | HPLMN NSI ID 2* | VPLMN Service Area 2 |
| 3 | VPLMN S-NSSAI 3 | HPLMN S-NSSAI 3* | VPLMN NSI ID 3 | HPLMN NSI ID 3* | VPLMN Service Area 3 |

Step 909: The AMF node sends a network element discovery request to an NRF device.

Based on the allowed NSSAI of the terminal device and the service area information corresponding to the allowed NSSAI that are obtained, and registration area information of the terminal device, the AMF node determines attribute information of a slice instance corresponding to each S-NSSAI in the allowed NSSAI, where the attribute information is used to indicate whether a service area of the slice instance corresponding to the S-NSSAI includes a registration area of the terminal device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 8, content that may be carried by the network element discovery request is shown in Table 9. Assuming that a service area of a VPLMN slice instance having a slice instance identifier 3 does not include the registration area of the terminal device, the network element discovery request carries only information of a VPLMN slice instance having slice instance identifiers 1 and 2.

TABLE 9

| 1 | VPLMN NSI ID 1 | VPLMN Service Area 1 |
| 2 | VPLMN NSI ID 2 | VPLMN Service Area 2 |

Step 910: The NRF device sends a network element discovery request response message to the AMF node.

The network element discovery request response message includes address information of a target AMF node. The NRF device determines, based on content carried by the network element discovery request message, the target AMF node serving the terminal device. In other words, the terminal device may be relocated to the target AMF node.

Step 911. The AMF node sends a non-access stratum message, and allowed NSSAI and service area information corresponding to the allowed NSSAI that are obtained by the AMF node in step 908 to a target AMF node.

The non-access stratum message is the registration request message in step 901.

Optionally, the allowed NSSAI includes the attribute information of the slice instance corresponding to each S-NSSAI in the allowed NSSAI in step 909. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 908 to the target AMF node by using a RAN node. For example, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 908, and the registration request message to the target AMF node.

Optionally, information that is sent by the AMF node to the target AMF node by using the RAN node may further include the attribute information in step 909.

Step 912: The target AMF node stores the allowed NSSAI of the VPLMN and the service area information corresponding to the allowed NSSAI of the VPLMN that are sent by the AMF node, to determine a slice instance for a session setup request when receiving the session setup request of the terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

In the embodiment shown in FIG. 9, the NSSF node determines the allowed NSSAI of the VPLMN for the terminal device. In another embodiment, the AMF node may further determine the allowed NSSAI of the VPLMN after step 908 and before step 909. For specific implementation steps, refer to steps described in the embodiment shown in FIG. 3 or FIG. 5. Details are not described herein again.

This embodiment of the present disclosure further provides another possible implementation in this scenario. An interface may be provided between the NSSF node and the UDM device of the HPLMN, and the NSSF node may directly obtain the subscription information of the roaming terminal device from the UDM of the HPLMN instead of the AMF node. For specific implementation steps, refer to descriptions of related steps in the embodiments shown in FIG. 3 and FIG. 4. Details are not described herein again.

Figure 10:
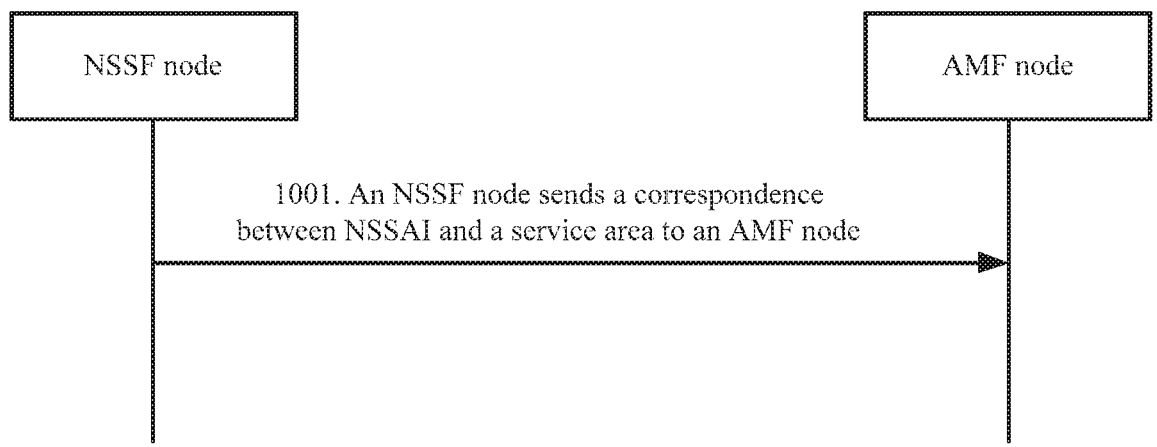
FIG. 10 is a schematic flowchart of a slice-based communications method according to an embodiment of the present disclosure.

In the embodiments shown in FIG. 3 to FIG. 9, the NSSF node may further send the preconfigured correspondence between NSSAI and a service area to the AMF node. In this case, the response message sent by the NSSF node to the AMF node does not need to include service area information supported by NSSAI, as shown in a procedure of FIG. 10.

Step 1001. An NSSF node sends a correspondence between NSSAI and a service area to an AMF node.

The NSSF configures service area information of a slice instance corresponding to each S-NSSAI in NSSAI for the AMF node in advance, and the AMF node does not need to obtain the correspondence between NSSAI and a service area from the NSSF node again after each terminal device sends a registration request.

For example, the AMF may be notified of the correspondence between NSSAI and a service area when the NSSF node and the AMF node establish a device connection. The correspondence between NSSAI and a service area may indicate service area information of slice instances corresponding to all S-NSSAI supported in a PLMN, or may indicate service area information of a slice instance corresponding to S-NSSAI supported by the AMF or an AMF group of the AMF.

For example, the NSSAI may be a set of S-NSSAI supported by a PLMN of the NSSF, or may be a set of S-NSSAI that is determined based on a network deployment or a network policy and that may be provided to the AMF node.

Figure 11:
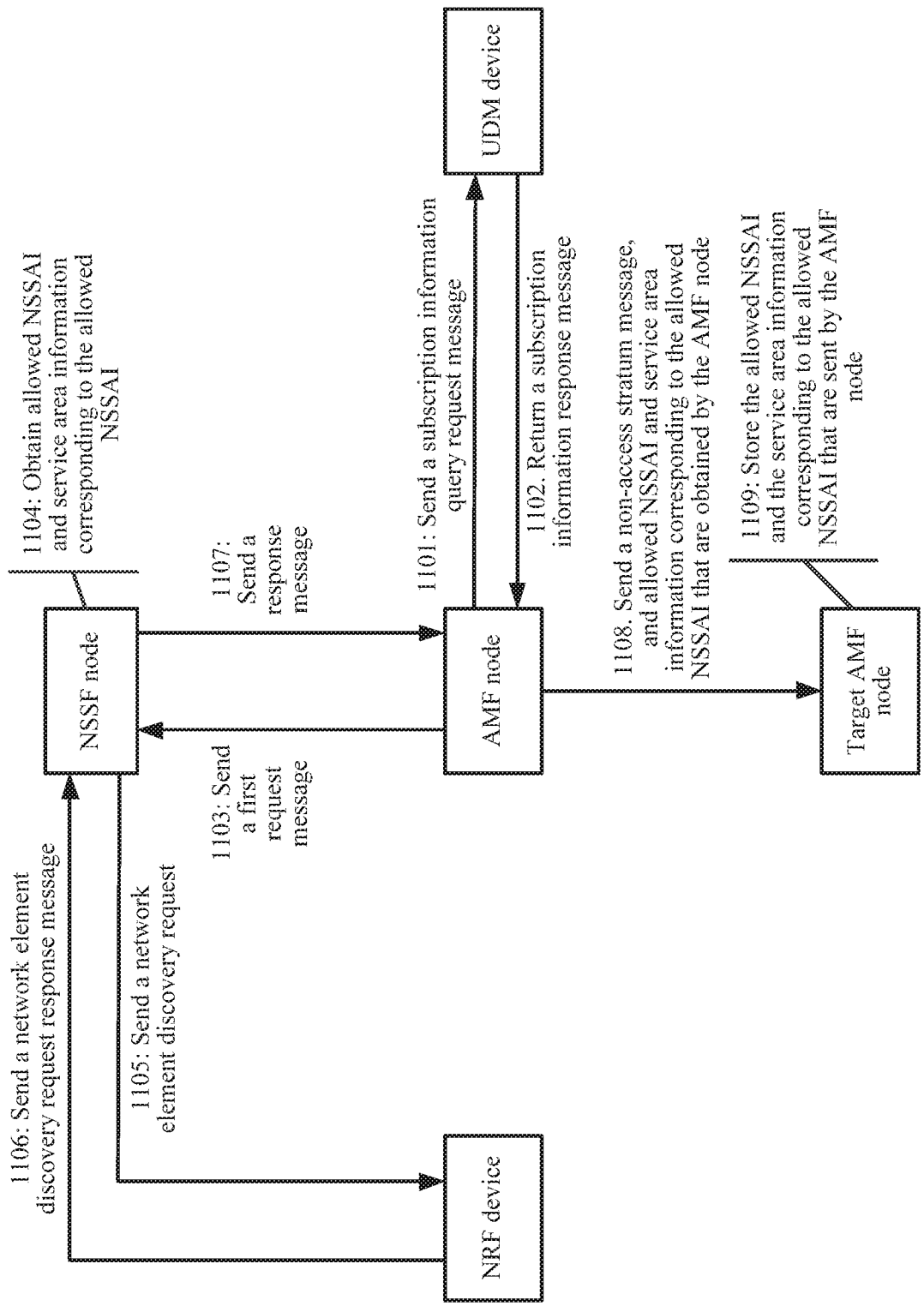
FIG. 11 is a schematic flowchart of a slice-based communications method according to an embodiment of the present disclosure.

As shown in FIG. 11, when a terminal device is in a non-roaming scenario, a slice-based communication procedure includes the following specific steps.

Step 1101: An AMF node sends a subscription information query request message to a UDM device.

After receiving a registration request message that is sent by a terminal device and forwarded by a RAN, the AMF node needs to query subscription information of the terminal device from the UDM device. The subscription information query request message carries an SUPI of the terminal device. The subscription information of the terminal device is queried by using the SUPI of the terminal device. Optionally, the registration request message may further include configured NSSAI.

Step 1102. The UDM device returns a subscription information response message to the AMF node.

The UDM device obtains the subscription information of the terminal device based on the SUPI of the terminal device that is sent by the AMF node, and returns the subscription information response message to the AMF node. The subscription information response message carries the subscription information of the terminal device. The subscription information includes subscribed NSSAI of the terminal device, and optionally may further include type information of the terminal device.

Step 1103: The AMF node sends a first request message to an NSSF node.

The first request message carries first NSSAI. The first NSSAI may be obtained by the AMF node based on the configured NSSAI carried by the subscription information of the terminal device and/or the registration request message of the terminal device. The first NSSAI is associated with the subscription information and/or the configured NSSAI. The first request message may further carry registration area information of the terminal device.

Step 1104: The NSSF node obtains allowed NSSAI and service area information corresponding to the allowed NSSAI.

The NSSF node may obtain, based on a correspondence between NSSAI and a service area that is obtained from an OAM system by the NSSF node, the first NSSAI, and other information, the allowed NSSAI of the terminal device and the service area information corresponding to the allowed NSSAI. The allowed NSSAI is associated with the first NSSAI, and may be a universal set or a subset of the first NSSAI.

The NSSF node determines, based on the allowed NSSAI of the terminal device and the service area information corresponding to the allowed NSSAI that are obtained and the registration area information of the terminal device, attribute information of a slice instance corresponding to each S-NSSAI in the allowed NSSAI, where the attribute information is used to indicate whether a service area of the slice instance corresponding to the S-NSSAI includes a registration area of the terminal device.

Step 1105: The NSSF node sends a network element discovery request message to an NRF device.

Attribute information of a slice instance carried by the network element discovery request or a slice instance corresponding to S-NSSAI indicates that a service area of the slice instance corresponding to the S-NSSAI or the slice instance includes the registration area of the terminal device.

Content included in the network element discovery request may be further determined based on content in the response message sent by the NSSF node. When the response message carries content shown in Table 1, content that may be carried by the network element discovery request is shown in Table 3. Assuming that a service area of a slice instance having a slice instance identifier 3 does not include the registration area of the terminal device, the network element discovery request carries only information of slice instances having slice instance identifiers 1 and 2. When the response message carries content shown in Table 2, content that may be carried by the network element discovery request is shown in Table 4. Assuming that a service area of a slice instance corresponding to slice S-NSSAI 3 does not include the registration area of the terminal device, the network element discovery request carries only information of slice S-NSSAI 1 and 2.

Step 1106: The NRF device sends a network element discovery request response message to the NSSF node.

The network element discovery request response message includes address information of a target AMF node. The NRF device determines, based on content carried by the network element discovery request message, the target AMF node serving the terminal device. In other words, the terminal device may be relocated to the target AMF node.

Step 1107: The NSSF node sends a response message to the AMF node.

The response message carries the allowed NSSAI and the service area information corresponding to the allowed NSSAI. The response message further carries the address information of the target AMF node. Optionally, the response message may further include slice instance identification information corresponding to each S-NSSAI in the allowed NSSAI, for example, as shown in Table 1 or Table 2. Optionally, the response message may further include the attribute information of the slice instance corresponding to each S-NSSAI in the allowed NSSAI in step 1105. Alternatively, the NSSF node sends the attribute information to the AMF node.

Step 1108. The AMF node sends a non-access stratum message, and allowed NSSAI and service area information corresponding to the allowed NSSAI that are obtained by the AMF node in step 1107 to a target AMF node.

The non-access stratum message is the registration request message in step 1101.

Optionally, the allowed NSSAI includes the attribute information of the slice instance corresponding to each S-NSSAI in the allowed NSSAI in step 1105. Alternatively, the AMF node sends the attribute information to the target AMF node.

Optionally, the AMF node may send the non-access stratum message, and the allowed NSSAI and the service area information corresponding to the allowed NSSAI that are obtained by the AMF node in step 1107 to the target AMF node by using a RAN node. Specifically, the AMF node instructs the RAN node to relocate the registration request message and the address information or identification information of the target AMF node. The RAN node forwards the non-access stratum message, the allowed NSSAI and the service area information corresponding to the allowed NSSAI that are obtained by the AMF node in step 1107, and the registration request message to the target AMF node.

Optionally, information that is sent by the AMF node to the target AMF node by using the RAN node may further include the attribute information in step 1105.

Step 1109: The target AMF node stores the allowed NSSAI and the service area information corresponding to the allowed NSSAI that are sent by the AMF node, to determine a slice instance for a session setup request when receiving the session setup request of a terminal device.

Optionally, the target AMF node further determines, based on the allowed NSSAI of the terminal device and the service area information corresponding to the allowed NSSAI that are obtained and the registration area information of the terminal device, the attribute information of the slice instance corresponding to each S-NSSAI in the allowed NSSAI, where the attribute information is used to indicate whether the service area of the slice instance corresponding to the S-NSSAI includes the registration area of the terminal device, and indicates, to the terminal device based on the attribute information, whether each S-NSSAI in the allowed NSSAI is supported or allowed in the registration area. For example, this may be indicated in Table 5.

For example, the indication may be carried by a registration response message sent by the AMF to the terminal device by using the RAN node.

This embodiment of the present disclosure further provides another possible implementation in this scenario. An interface may be provided between the NSSF node and the UDM device, and the NSSF node may directly obtain the subscription information of the roaming terminal device from the UDM of the HPLMN instead of the AMF node. For specific implementation steps, refer to descriptions of related steps in the embodiments shown in FIG. 3 and FIG. 4. Details are not described herein again.

Figure 12:
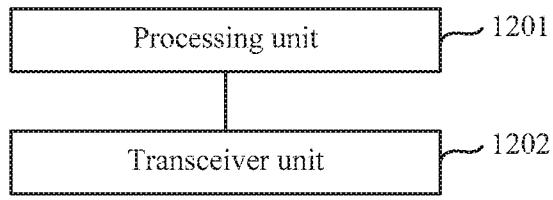
FIG. 12 is a schematic structural diagram of a slice-based communications apparatus according to an embodiment of the present disclosure.

Based on a same technical idea, FIG. 12 shows a slice-based communications apparatus according to an embodiment of the present disclosure. The apparatus may execute a slice-based communication procedure.

As shown in FIG. 12, the apparatus specifically includes: a processing unit 1201 and a transceiver unit 1202, where the processing unit 1201 is configured to control the transceiver unit 1202 to send a first request message to an NSSF node; and the processing unit 1201 is further configured to: control the transceiver unit 1202 to receive a response message from the NSSF node, and obtain, based on the response message, allowed network slice selection assistance information NSSAI of a terminal device and service area information corresponding to the allowed NSSAI.

In addition, the processing unit 1201 and the transceiver unit 1202 may further perform various other operations of the AMF node in the foregoing embodiments. Details are not described again.

Figure 13:
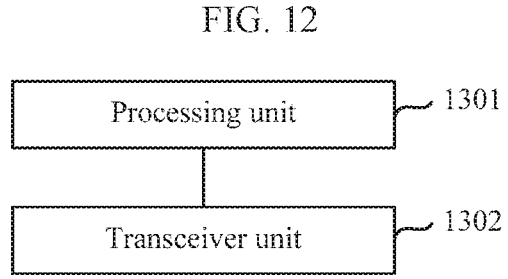
FIG. 13 is a schematic structural diagram of a slice-based communications apparatus according to an embodiment of the present disclosure.

Based on a same technical idea, FIG. 13 shows a slice-based communications apparatus according to an embodiment of the present disclosure. The apparatus may execute a slice-based communication procedure.

As shown in FIG. 13, the apparatus specifically includes: a processing unit 1301 and a transceiver unit 1302, where the processing unit 1301 is configured to control the transceiver unit 1302 to receive a first request message from an AMF node; and the processing unit 1301 is further configured to control the transceiver unit 1302 to send a response message to the AMF node, where the response message carries network slice selection assistance information NSSAI, or the NSSAI and service area information corresponding to the NSSAI.

In addition, the processing unit 1301 and the transceiver unit 1302 may further perform various other operations of the NSSF node in the foregoing embodiments. Details are not described again.

Figure 14:
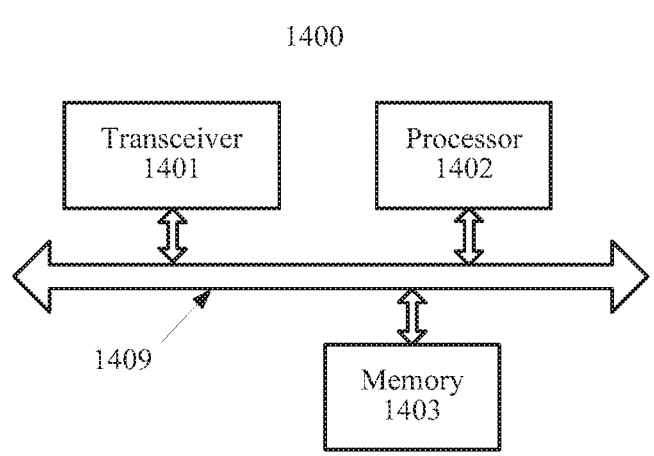
FIG. 14 is a schematic structural diagram of a slice-based communications device according to an embodiment of the present disclosure.

Based on a same technical idea. FIG. 14 shows a slice-based communications device 1400 according to an embodiment of the present disclosure. The slice-based communications device 1400 may perform steps or functions performed by the AMF node in the foregoing embodiments. The slice-based communications device 1400 may include: a transceiver 1401, a processor 1402, and a memory 1403. The processor 1402 is configured to control operations of the slice-based communications device 1400. The memory 1403 may include a read-only memory and a random access memory, and stores an instruction that may be executed by the processor 1402 and data. Components such as the transceiver 1401, the processor 1402, and the memory 1403 are connected by using a bus 1409. The bus 1409 may further include a power supply bus, a control bus, and a state signal bus in addition to a data bus. However, for the purpose of clear descriptions, various buses are all marked as the bus 1409 in the figure. The transceiver 1401 may be a transceiver machine, and may include a transmitter and a receiver.

A slice-based communications method disclosed in the embodiments of the present disclosure may be applied to the processor 1402 or performed by the processor 1402.

The processor 1402 is configured to read code in the memory 1403 to execute a slice-based communication procedure.

For example, optionally, when obtaining, based on the response message, the allowed NSSAI of the terminal device and the service area information corresponding to the allowed NSSAI, the processor 1402 is specifically configured to:

when the response message carries the allowed NSSAI and the service area information corresponding to the allowed NSSAI, obtain the allowed NSSAI and the service area information corresponding to the allowed NSSAI from the response message; or when the response message carries the allowed NSSAI, obtain the allowed NSSAI from the response message, and obtain, based on a correspondence between NSSAI and a service area, the service area information corresponding to the allowed NSSAI; or when the response message carries first NSSAI and service area information corresponding to the first NSSAI, determine, based on the first NSSAI and the service area information corresponding to the first NSSAI, the allowed NSSAI and the service area information corresponding to the allowed NSSAI.

Optionally, the processor 1402 is further configured to:

query subscription information of the terminal device, where the subscription information includes subscribed NSSAI of the terminal device, the first request message carries the first NSSAI, and the first NSSAI is associated with the subscribed NSSAI.

Optionally, the processor 1402 is further configured to:

control the transceiver 1401 to receive a registration request message from the terminal device, where the registration request message carries configured NSSAI, the first request message carries the first NSSAI, and the first NSSAI is associated with the configured NSSAI, or the first NSSAI is associated with the subscribed NSSAI and the configured NSSAI.

Figure 15:
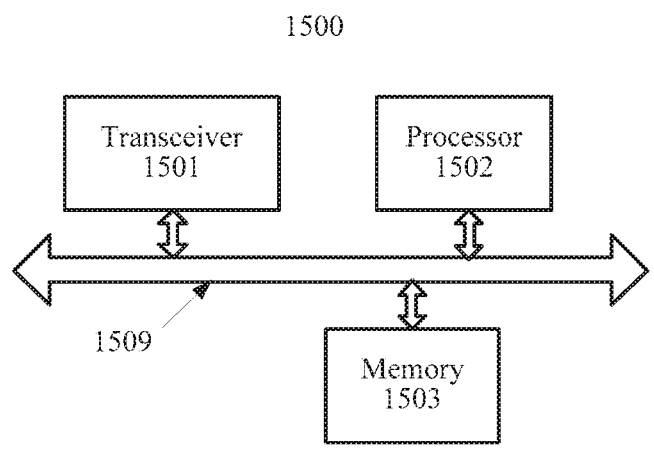
FIG. 15 is a schematic structural diagram of a slice-based communications device according to an embodiment of the present disclosure.

Based on a same technical idea, FIG. 15 shows a slice-based communications device 1500 according to an embodiment of the present disclosure. The slice-based communications device 1500 may perform steps or functions performed by the NSSF node in the foregoing embodiments. The slice-based communications device 1500 may include: a transceiver 1501, a processor 1502, and a memory 1503. The processor 1502 is configured to control operations of the slice-based communications device 1500. The memory 1503 may include a read-only memory and a random access memory, and stores an instruction and data that may be executed by the processor 1502. Components such as the transceiver 1501, the processor 1502, and the memory 1503 are connected by using a bus 1509. The bus 1509 may further include a power supply bus, a control bus, and a state signal bus in addition to a data bus. However, for the purpose of clear descriptions, various buses are all marked as the bus 1509 in the figure. The transceiver 1501 may be a transceiver machine, and may include a transmitter and a receiver.

A slice-based communications method disclosed in the embodiments of the present disclosure may be applied to the processor 1502 or performed by the processor 1502.

The processor 1502 is configured to read code in the memory 1503 to execute a slice-based communication procedure.

For example, optionally, the NSSAI is allowed NSSAI.

Optionally, the first request message carries first NSSAI, and the allowed NSSAI is associated with the first NSSAI; and the first NSSAI is associated with subscribed NSSAI, or the first NSSAI is associated with configured NSSAI, or the first NSSAI is associated with the subscribed NSSAI and the configured NSSAI; or the first request message carries identification information of a terminal device; and the processor 1502 is further configured to: query subscription information of the terminal device based on the identification information, where the subscription information includes subscribed NSSAI of the terminal device, and the allowed NSSAI is associated with the subscribed NSSAI.

Optionally, the first request message carries first NSSAI, and the NSSAI is the first NSSAI;

the first NSSAI is associated with subscribed NSSAI, or the first NSSAI is associated with configured NSSAI, or the first NSSAI is associated with the subscribed NSSAI and the configured NSSAI;

the first request message carries identification information of a terminal device; and the processor 1502 is further configured to:

query subscription information of the terminal device based on the identification information, where the subscription information includes subscribed NSSAI of the terminal device, and the first NSSAI is associated with the subscribed NSSAI.

A person skilled in the art should understand that the embodiments of the present disclosure may be provided as a method, a system, or a computer program product. Therefore, the embodiments of the present disclosure may use a form of hardware only embodiments, software only embodiments, or embodiments with a combination of software and hardware. Moreover, the embodiments of the present disclosure may use a form of a computer program product that is implemented on one or more computer-usable storage media (including but not limited to a disk memory, a CD-ROM, an optical memory, and the like) that include computer-usable program code.

The embodiments of the present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to embodiments of the present disclosure without departing from the spirit and scope of the present disclosure. The present disclosure is intended to cover these modifications and variations provided that they fall within the scope of protection defined by the following claims and their equivalent technologies.

What is claimed is:

1. A slice-based communications method, comprising:
   obtaining, by an access and mobility management function node in a visited public land mobile network (VPLMN) for a terminal device, a correspondence between network slice selection assistance information and a service area;
   sending, by the access and mobility management function node, a first request message to a network slice selection function node in the VPLMN for the terminal device;
   receiving, by the network slice selection function node, the first request message;
   sending, by the network slice selection function node, a response message to the access and mobility management function node, the response message comprising allowed network slice selection assistance information of the VPLMN, the response message further comprising second network slice selection assistance information of a home public land mobile network (HPLMN) that corresponds to the allowed network slice selection assistance information of the VPLMN; and
   determining, by the access and mobility management function node, service area information corresponding to the allowed network slice selection assistance information of the VPLMN based on the allowed network slice selection assistance information of the VPLMN from the response message and the correspondence between the network slice selection assistance information and the service area.

2. The method according to claim 1, wherein the response message further comprises identification information of a slice instance for a network slice corresponding to each single network slice selection assistance information in the allowed network slice selection assistance information of the VPLMN.

3. The method according to claim 1, wherein the first request message comprises first network slice selection assistance information, the allowed network slice selection assistance information of the VPLMN being determined based on the first network slice selection assistance information and one of:
   the first network slice selection assistance information associated with subscribed network slice selection assistance information;
   the first network slice selection assistance information associated with configured network slice selection assistance information; or
   the first NSSAI associated with the subscribed network slice selection assistance information and the configured network slice selection assistance information.

4. The method according to claim 1, wherein the first request message comprises identification information of the terminal device, the method further comprising:
   querying, by the network slice selection function node, subscription information of the terminal device based on the identification information, wherein the subscription information comprises subscribed network slice selection assistance information of the terminal device and the allowed network slice selection assistance information of the VPLMN is associated with the subscribed network slice selection assistance information.

5. The method according to claim 4, wherein the subscription information of the terminal device further comprises a type of the terminal device, and the first request message further comprises the type of the terminal device.

6. The method according to claim 1, further comprising:
   sending, by the network slice selection function node, the correspondence to the access and mobility management function node.

7. The method according to claim 1, wherein the response message further comprises identification information of a slice instance for a network slice corresponding to each single network slice selection assistance information in the second network slice selection assistance information of the HPLMN.

8. A slice-based communications system, comprising:
   an access and mobility management function node in a visited public land mobile network (VPLMN) for a terminal device, the access and mobility management function being configured to obtain a correspondence between network slice selection assistance information and a service area; and send a first request message; and
   a network slice selection function node in the VPLMN for the terminal device, the network slice selection function being configured to receive the first request message from the access and mobility management function node and to send a response message to the access and mobility management function node, wherein the response message comprises allowed network slice selection assistance information of the VPLMN and second network slice selection assistance information of a home public land mobile network (HPLMN) that corresponds to the allowed network slice selection assistance information of the VPLMN; and
   wherein the access and mobility management function node is further configured to determine service area information corresponding to the allowed network slice selection assistance information of the VPLMN based on the allowed network slice selection assistance information of the VPLMN from the response message and the correspondence between the network slice selection assistance information and the service area.

9. The system according to claim 8, wherein the response message further comprises identification information of a slice instance for a network slice corresponding to each single network slice selection assistance information in the allowed network slice selection assistance information of the VPLMN.

10. The system according to claim 8, wherein the first request message comprises first network slice selection assistance information, the allowed network slice selection assistance information of the VPLMN being determined based on the first network slice selection assistance information, and one of:
- the first network slice selection assistance information associated with subscribed network slice selection assistance information;
- the first network slice selection assistance information associated with configured network slice selection assistance information; or
- the first NSSAI associated with the subscribed network slice selection assistance information and the configured network slice selection assistance information.

11. The system according to claim 8, wherein the first request message comprises identification information of the terminal device, and the network slice selection function node is further configured to queue subscription information of the terminal device based on the identification information, wherein the subscription information comprises subscribed network slice selection assistance information of the terminal device, and the allowed network slice selection assistance information of the VPLMN is associated with the subscribed network slice selection assistance information.

12. The system according to claim 11, wherein the subscription information of the terminal device further comprises a type of the terminal device, and the first request message further comprises the type of the terminal device.

13. The system according to claim 8, wherein the network slice selection function node is further configured to send the correspondence to the access and mobility management function node.

14. The system according to claim 8, wherein the response message further comprises identification information of a slice instance for a network slice corresponding to each single network slice selection assistance information in the second network slice selection assistance information of the HPLMN.

15. A slice-based communications method, comprising:
- obtaining, by an access and mobility management function node in a visited public land mobile network (VPLMN) for a terminal device, a correspondence between network slice selection assistance information and a service area;
- sending, by the access and mobility management function node, a first request message to a network slice selection function node in the VPLMN for the terminal device;
- receiving, by the access and mobility management function node from the network slice selection function node in the VPLMN, a response message comprising allowed network slice selection assistance information of the VPLMN and second network slice selection assistance information of a home public land mobile network (HPLMN) that corresponds to the allowed network slice selection assistance information of the VPLMN; and
- determining, by the access and mobility management function node, service area information corresponding to the allowed network slice selection assistance information of the VPLMN based on the allowed network slice selection assistance information of the VPLMN from the response message and the correspondence between the network slice selection assistance information and the service area.

16. The method according to claim 15, wherein the response message further comprises identification information of a slice instance for a network slice corresponding to each single network slice selection assistance information in the allowed network slice selection assistance information of the VPLMN.

17. The method according to claim 15, wherein the response message further comprises identification information of a slice instance for a network slice corresponding to each single network slice selection assistance information in the second network slice selection assistance information of the HPLMN.

18. A slice-based communications apparatus, comprising:
- a transceiver, configured to send a first request message to a network slice selection function node in a visited public land mobile network (VPLMN) for a terminal device; and to receive, from the VPLMN, a response message comprising allowed network slice selection assistance information of the VPLMN, and second network slice selection assistance information of a home public land mobile network (HPLMN) that corresponds to the allowed network slice selection assistance information of the VPLMN; and
- a processor, configured to obtain a correspondence between network slice selection assistance information and a service area and to determine service area information corresponding to the allowed network slice selection assistance information of the VPLMN based on the allowed network slice selection assistance information of the VPLMN from the response message and the correspondence between the network slice selection assistance information and the service area.

19. The apparatus according to claim 18, wherein the response message further comprises identification information of a slice instance for a network slice corresponding to each single network slice selection assistance information in the allowed network slice selection assistance information of the VPLMN.

20. The apparatus according to claim 18, wherein the response message further comprises identification information of a slice instance for a network slice corresponding to each single network slice selection assistance information in the second network slice selection assistance information of the HPLMN.

* * * * *